US012162744B2

(12) United States Patent
Comunale

(10) Patent No.: US 12,162,744 B2
(45) Date of Patent: Dec. 10, 2024

(54) SCALABLE MODULAR SYSTEM AND METHOD FOR STORING, PRESERVING,MANAGING, AND SELECTIVELY DISPENSING BEVERAGES

(71) Applicant: Versabev, Inc., Harrison, NY (US)

(72) Inventor: Sal Comunale, Harrison, NY (US)

(73) Assignee: Versabev, Inc., Harrison, NY (US)

( * ) Notice: Subject to any disclaimer, the term of this patent is extended or adjusted under 35 U.S.C. 154(b) by 0 days.

(21) Appl. No.: 18/040,565

(22) PCT Filed: Nov. 8, 2021

(86) PCT No.: PCT/US2021/058497

§ 371 (c)(1),
(2) Date: Feb. 3, 2023

(87) PCT Pub. No.: WO2022/099160

PCT Pub. Date: May 12, 2022

(65) Prior Publication Data

US 2023/0294973 A1 Sep. 21, 2023

Related U.S. Application Data

(60) Provisional application No. 63/110,938, filed on Nov. 6, 2020.

(51) Int. Cl.
*B67D 1/12* (2006.01)
*B67D 1/00* (2006.01)
(Continued)

(52) U.S. Cl.
CPC ......... *B67D 1/1281* (2013.01); *B67D 1/0024* (2013.01); *B67D 1/0036* (2013.01);
(Continued)

(58) Field of Classification Search
CPC .. B67D 1/1281; B67D 1/0024; B67D 1/0036; B67D 1/0045; B67D 1/0052;
(Continued)

(56) References Cited

U.S. PATENT DOCUMENTS

| | | | |
|---|---|---|---|
| 2,219,334 | A | 10/1940 | Rourke |
| 3,195,779 | A | 7/1965 | Stanley |

(Continued)

FOREIGN PATENT DOCUMENTS

| | | | |
|---|---|---|---|
| AU | 2015218607 | A1 | 10/2016 |
| CN | 104066675 | A | 9/2014 |

(Continued)

OTHER PUBLICATIONS

Chinese Patent Application No. 2021800892219, First Office Action dated Dec. 7, 2023, 7 pages.

(Continued)

*Primary Examiner* — Donnell A Long
(74) *Attorney, Agent, or Firm* — Ahmann Kloke LLP

(57) ABSTRACT

An example system includes an incompressible, airtight pressurized container operable to maintain a pressure level in an internal pressurized environment, a transport system including at least two liquid transport conduits, and a mixing component, the two liquid conduits each being releasably coupled to a pressurized container interface coupled to the pressurized container and a dispensing interface, each liquid transport conduit including a controllable valve to enable or disable a flow of the liquid volume, the pressurized container interface capable of maintaining the pressure level, the mixing component being coupled to the at least two liquid transport conduits and the dispensing interface, a pressure regulation system connected to the pressurized container, the pressure regulation system operable to exert and maintain the pressure level within the pressurized container to enable (Continued)

compression of the first compressible liquid volume, and a control system operable to control the controllable valves and the pressure regulation system.

19 Claims, 19 Drawing Sheets

(51) Int. Cl.
*B67D 1/07* (2006.01)
*B67D 1/08* (2006.01)

(52) U.S. Cl.
CPC ......... *B67D 1/0045* (2013.01); *B67D 1/0052* (2013.01); *B67D 1/0085* (2013.01); *B67D 1/07* (2013.01); *B67D 1/0888* (2013.01); *B67D 1/1252* (2013.01); *B67D 1/0047* (2013.01); *B67D 1/005* (2013.01); *B67D 2001/0093* (2013.01); *B67D 2001/0097* (2013.01); *B67D 1/0857* (2013.01); *B67D 1/0895* (2013.01)

(58) Field of Classification Search
CPC ...... B67D 1/0085; B67D 1/07; B67D 1/0888; B67D 1/1252; B67D 1/0047; B67D 1/005; B67D 1/0857; B67D 1/0895; B67D 2001/0093; B67D 2001/0097; B67D 1/0051; B67D 1/0011; B67D 1/0462; B67D 1/1279
See application file for complete search history.

(56) References Cited

U.S. PATENT DOCUMENTS

| | | | | | |
|---|---|---|---|---|---|
| 4,377,246 | A * | 3/1983 | McMillin | B67D 1/0406 222/61 |
| 4,520,950 | A * | 6/1985 | Jeans | B67D 1/0021 137/614.04 |
| 4,560,089 | A * | 12/1985 | McMillin | B67D 1/0011 222/61 |
| 4,796,788 | A | 1/1989 | Bond | |
| 4,857,055 | A | 8/1989 | Wang | |
| 5,011,700 | A | 4/1991 | Gustafson et al. | |
| 5,240,144 | A | 8/1993 | Feldman | |
| 6,820,763 | B2 | 11/2004 | Bilskie et al. | |
| 6,824,017 | B2 | 11/2004 | Sluijter | |
| 7,810,679 | B2 | 10/2010 | Wauters et al. | |
| 10,865,092 | B1 * | 12/2020 | Fitt | B67D 1/0057 |
| 2005/0194399 | A1 | 9/2005 | Proctor | |
| 2006/0113323 | A1 * | 6/2006 | Jones | B67D 1/0021 222/129.1 |
| 2007/0288249 | A1 | 12/2007 | Rowe et al. | |
| 2014/0166053 | A1 * | 6/2014 | Carson | B08B 9/0321 222/30 |
| 2015/0028052 | A1 | 1/2015 | Rasmussen et al. | |
| 2016/0175781 | A1 * | 6/2016 | Hubbard, Jr. | B67D 1/008 261/77 |
| 2016/0236926 | A1 * | 8/2016 | Leyva | B67D 1/06 |
| 2017/0144877 | A1 * | 5/2017 | Rider | B67D 3/0051 |
| 2017/0240405 | A1 * | 8/2017 | Gibson | B67D 1/0406 |
| 2017/0365083 | A1 | 12/2017 | Hartrell et al. | |
| 2020/0002149 | A1 * | 1/2020 | Pickett | B08B 9/027 |
| 2020/0146500 | A1 * | 5/2020 | Cafaro | B67D 1/0801 |
| 2021/0214209 | A1 * | 7/2021 | Abraham | B67D 1/0862 |

FOREIGN PATENT DOCUMENTS

| | | | |
|---|---|---|---|
| CN | 106458376 | B | 3/2020 |
| EP | 3272702 | A4 | 11/2018 |
| WO | 2020125057 | A1 | 6/2020 |

OTHER PUBLICATIONS

International Application No. PCT/US2021/058497, International Search Report and the Written Opinion, dated Mar. 28, 2021, 9 pages.

Chinese Patent Application No. 2021800892219, Second Office Action dated May 15, 2024, 18 pages.

Chinese Patent Application No. 2021800892219, Decision of Rejection dated Jul. 29, 2024, 25 pages.

* cited by examiner

SCALABLE MODULAR SYSTEM AND METHOD FOR STORING, PRESERVING,MANAGING, AND SELECTIVELY DISPENSING BEVERAGES

CROSS-REFERENCE TO RELATED APPLICATIONS

This application is a national phase application pursuant to 35 U.S.C. § 371 of International Application No. PCT/US21/58497, filed on Nov. 8, 2021, entitled "Scalable Modular System and Method for Storing, Preserving, Managing, and Selectively Dispensing Beverages," which claims the benefit of U.S. Provisional Patent Application No. 63/110,938, filed on Nov. 6, 2020, and entitled "Scalable Modular System and Method for Storing, Preserving, Managing, and Selectively Dispensing Beverages", which are incorporated in their entirety herein by reference.

FIELD OF THE INVENTION(S)

The present invention(s) generally relates to systems and methods for storing and dispensing liquids, and more particularly to systems and methods for selectively dispensing liquids (such as wine or similar beverages) stored in a pressurized environment by utilizing a controlled source of pressure force to apply sufficient pressure to the pressurized environment to dispense a portion of the stored liquid in accordance with a desired dispensing regime.

BACKGROUND

The ever-increasing consumption of wine and similar beverages, both in various commercial establishments (e.g., restaurants, bars, lounges, etc.) and homes, coupled with growth in consumer perception of wine as an "experience" meant to be paired with proper food or enjoyed though "tastings," has resulted not only in growing consumer demand for a wider selection of wines made available in commercial establishments (leading to a proliferation of dedicated "wine bar" establishments) but also fueled the desire of many consumers to be able to bring the "wine bar" or equivalent experience to their home.

Restaurants have traditionally relied on bottle purchases by their patrons, leaving only a few low-end wines available for "by the glass" pours from bottles. Bottles that provide "by the glass" service may remain in use for several days after being opened. However, the quality of the product deteriorates due to inherent changes (e.g., oxidation) in wine over time when exposed to air.

In view of market trends, many establishments have been nevertheless forced to expand their "by-the-glass" (referred to as "BTG" herein) selections to meet consumer demand. The expansion of BTG service has greatly increased cost due to rapid deterioration of unsealed wine bottles and increased labor costs in managing a wide range of BTG pours. Stand-alone bars and lounges have traditionally offered limited wine selections, but in view of the trends mentioned above, these entertainment venues are faced with the same obstacles as restaurants. Finally, wine bars are forced to deal with the challenge of keeping a sufficiently wide-ranging BTG selection by their very nature.

Virtually all attempted solutions to the above challenges involve devices and systems for preservation and/or dispensation of bottled wines. As a result, these solutions are quite limited in their success due to inherent disadvantages of utilization of bottled wine in a commercial establishment environment. Moreover, because virtually all bottle-based wine preservation systems are sized and configured only for use with standard 750 ml bottles, these systems require frequent and time-consuming bottle replacement when the establishment is busy (i.e., precisely at a time when employees of an entertainment venue are under the greatest pressure to maintain an appropriately high level of speedy service to the customers). Moreover, because higher-end conventional wine preservation/dispensing systems comprise a separate chamber for each bottle, the expense of systems that includes a sufficient number of wine bottle chambers for larger establishments quickly rises into stratospheric levels.

To address the disadvantages of the use of bottled wine in commercial establishments, various companies proposed utilization of larger volume/less expensive "wine bags" (often offered in a "wine-in-bag"/"bag-in-box" format) (referred to herein as "WinB products").

The previously known WinB products have different disadvantages when used in commercial establishments, which in some cases can make them less desirable than bottled wine under many circumstances. These disadvantages have resulted in at least the following key obstacles to wide-ranging successful use of WinB products in commercial and environments:

- the difficulties in preserving and pouring wine from WinB product containers;
- the amount of space taken up by WinB products and their containers—an especially serious issue for commercial environments where space is at a premium;
- the challenge posed in commercial environments by the necessity of metering wine pours of specific volume from the WinB products, and the difficulty in tracking such pours automatically; and
- The aesthetic appearance of most WinB products and their containers do not permit their use in tastefully decorated commercial and consumer environments.

For these reasons, WinB products have only found very limited acceptance in all but a few smaller establishments. To date, there has not been a suitable solution offered that would enable commercially practical use of wine-in-bag products in virtually all restaurant/bar (and similar) environments.

SUMMARY

An example system for selectively managing dispensing of a portion of a liquid volume stored in a pressurized environment comprises an incompressible, pressurized container, a transport system, a pressure regulation system, and a control system. The incompressible, pressurized container may include a hollow housing portion and an outer portion. The pressurized container may be airtight and operable to maintain a pressure level in an internal pressurized environment in the hollow housing portion. The transport system may include at least two liquid transport conduits and a mixing component. Each of the at least two liquid transport conduit may include a first end and a second end. The first end of each of the at least two liquid conduit may be releasably coupled to a pressurized container interface that is coupled to the hollow housing portion of the pressurized container. The second end of each of the at least two liquid transport conduit may be coupled to a dispensing interface. Each of the least two liquid transport conduit may include a controllable valve to enable or disable a flow of the liquid volume. The pressurized container interface may be capable of maintaining the pressure level in the internal pressurized environment in the hollow housing portion. The mixing component may be coupled to the at least two liquid transport conduits and the dispensing interface to enable mixing prior to dispensing. The pressure regulation system may be connected to the pressurized container. The pressure regulation system may include at least one pressure conduit extending from the outer portion through a pressure interface and into the hollow housing portion of the pressurized container. The pressure regulation system may be operable to exert and maintain the pressure level within the pressurized container to enable compression of the first compressible liquid volume in the internalized pressurized environment. The control system may be operable to control the controllable valves and the pressure regulation system.

In some embodiments, the mixing component includes a mixing chamber, the mixing chamber being an enclosed cavity which allows the liquid volume within the at least two liquid transport conduits to blend. In various embodiments, the mixing component includes a venturi.

The control system may receive control signals to dispense liquid from the at least two liquid transport conduits according to a blending profile. In some embodiments, the control system receives control signals to selectively control one or more of the controllable valves of the at least two liquid transport conduits. In various embodiments, control system receives control signals from a mobile computing device to blend liquid from the at least two liquid transport conduits.

The dispensing interface may comprise a multi-pour nozzle, the multi-pour nozzle comprising a plurality of nozzle elements, each of the plurality of nozzle elements capable of being connected to a different liquid transport conduit, each of the different liquid transport conduits being capable of being coupled to a different compressible liquid volume by a different releasable connection. The multi-pour nozzle may be configured to be equipped with a blend pour functionality, enabling pressurized liquid from two or more dispensing conduits to be dispensed in a blended pour. The multi-pour nozzle comprises 2 to 9 nozzle elements in some embodiments. The control system may be remotely operable to selectively activate substantially simultaneously two or more nozzle elements to enable the blend pour functionality.

In various embodiments, the control system is remotely operable to control the pressure regulation system to exert the pressure level in the internal pressurized environment to enable compression of the compressible pressurized container in the internal pressurized environment. The pressurized liquid may comprise an alcoholic beverage. In some embodiments, the alcoholic beverage comprises a mixed drink.

The valve may be a solenoid valve.

An example method may comprise receiving a first signal from a control signal to open a first valve of an incompressible, pressurized container, the pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible liquid volume and a second compressible liquid volume to be stored within the hollow housing portion, and in response to the first signal to open the first valve, opening a first valve of a first liquid transport conduit and a second liquid transport conduit, and blending liquid from the first liquid transport conduit and the second liquid conduit in a mixing component, the first liquid transport conduit being capable of enable or disabling a flow of liquid from the first compressible liquid volume, the second liquid transport conduit being capable of enable or disabling a flow of liquid from the second compressible liquid volume, each of the first liquid transport conduit and the second liquid transport conduit extending from a pressurized container interface of the hollow housing portion of the pressurized container to a dispensing interface, the pressurized container interface capable of maintaining the pressure level in the internal pressurized environment in the hollow housing portion, a pressure regulation system operable to exert and maintain the pressure level within the pressurized container to enable compression of the first compressible liquid volume and the second compressible liquid volume in the internalized pressurized environment.

The mixing component may include a mixing chamber, the mixing chamber being an enclosed cavity which allows the liquid volume within the first liquid transport conduit and the second liquid transport conduit to blend. The mixing component may include a venturi.

The dispensing interface may comprise a multi-pour nozzle. The multi-pour nozzle may comprise a plurality of nozzle elements, each of the plurality of nozzle elements capable of being connected to a different liquid transport conduit, each of the different liquid transport conduits being capable of being coupled to a different compressible liquid volume by a different releasable connection. The first signal may be received from a mobile computing device to dispense liquid from the first compressible liquid volume and the second compressible liquid volume according to a blending profile.

DETAILED DESCRIPTION OF PREFERRED EMBODIMENTS

Figure 1:
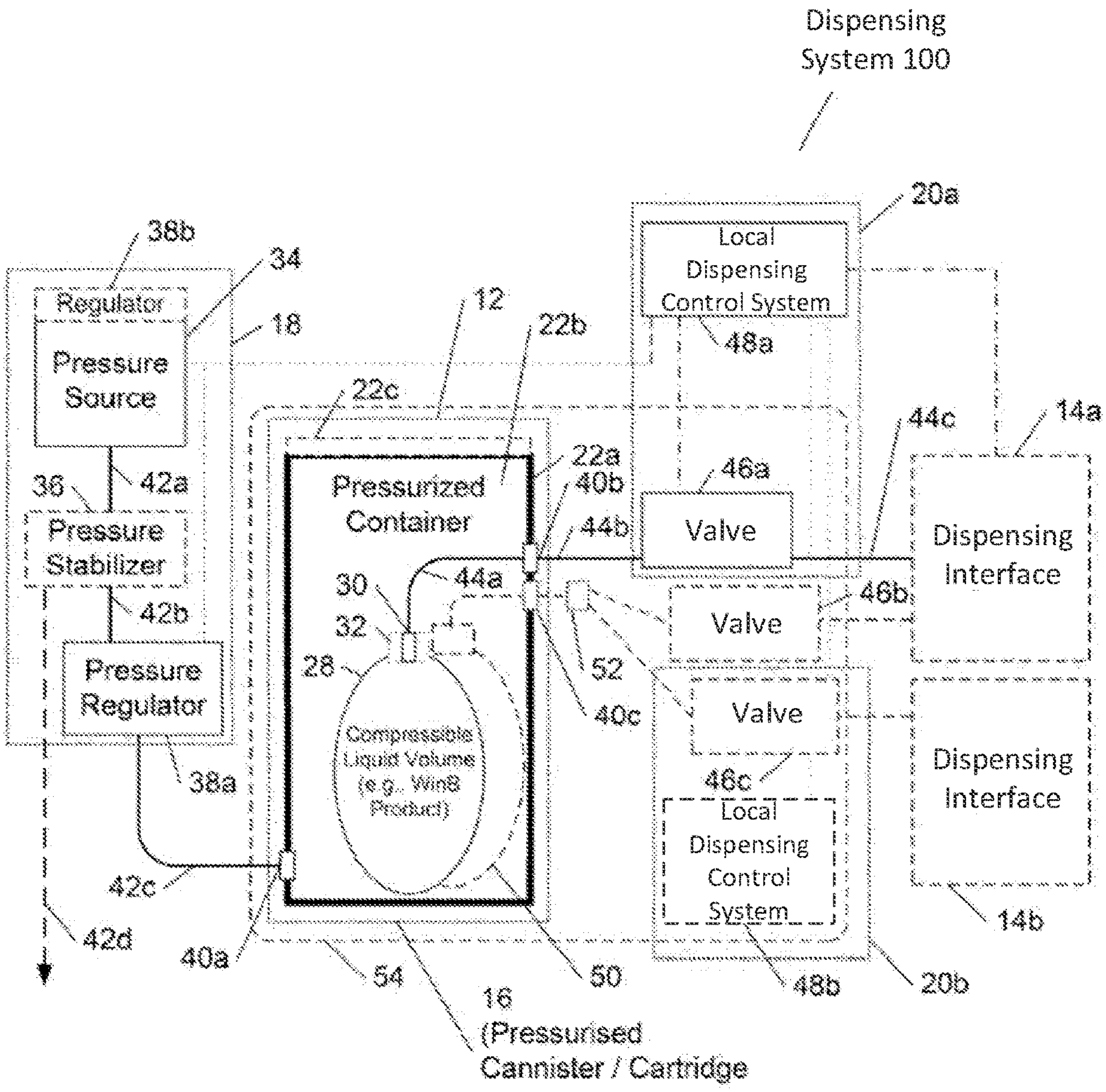
FIG. 1 is an illustrative diagram of a dispensing system capable of storing and dispensing beverages or food-like substances according to some embodiments.

It is desirable to provide a system and method that resolves one or more disadvantages of previously known WinB products and their dispensing containers in commercial environments. It is further desirable to provide a system and method that offers previously unavailable advantageous features relating to the preservation and controlled dispensation of beverages, such as wine and mixed drinks from WinB products and/or other sources. It is also desirable to provide a system and method for preserved storage and selectively controlled dispensation of beverages, foods, and mixed drinks that are configurable for use with various WinB products and their equivalents. Such a system and method may be modular and readily scalable for advantageous utilization in environments ranging from consumer homes to large commercial/hospitality establishments.

Various embodiments of a dispensing system provide an apparatus to store, preserve, manage, and selectively dispense beverage and food-like substances. Embodiments of the dispensing system remedies the flaws and drawbacks of all previously known wine storage and dispensing solutions (and especially larger-scale commercial solutions), regardless of their configuration, by storing a plurality of beverages (such as various wines, etc.) in a pressurized environment (which may be remotely located, and/or environmentally controlled) to ensure that the stored beverage or food-like substance stored in a pressurized environment (which may be remotely located, and/or environmentally controlled) to ensure that the stored beverage or food-like substance does not come into contact with air, and then by selectively dispensing a portion of the stored beverage or food-like substance, in accordance with a desired configurable dispensing regime (which may be configured and controlled locally, remotely, and/or via a computerized system), by utilizing a controlled source of pressure force to apply a sufficient degree pressure to the pressurized environment to expel the desired volume of the beverage in a pressurized stream directed to a remote dispensing/pouring interface (for example located in a desired area of a bar, restaurant, or other hospitality establishment) through a dispensing system (which may comprise one or more separate systems, for example directed to different areas of an entertainment venue).

In some embodiments, the system and method of the dispensing system are configured for use with one or more compressible wine-in-bag ("WinB") product containers placed into at least one pressurized chamber (serving as the pressurized environment). The product container(s) may be interfaced with a liquid delivery system connected to one or more dispensing components (such as shown and described in various embodiments of the novel pressurization-based liquid dispensing technology disclosed in the above-incorporated '876 application as a Pressurized Liquid Storage and Dispensing system ("PLSMPD system")).

Various embodiments discussed herein are scalable. For example, different embodiments may be utilized in conjunction with one or more WinB products and/or in conjunction with a flexible multi-area electronically controlled beverage dispensing infrastructure. Systems may be operable to interface with various hospitality (e.g., restaurant) management systems.

At the outset, it should be noted that while the various descriptions of the different embodiments of the system and method of the present invention describe the utilization thereof with wine, it should be understood to one skilled in the art that the various embodiments of the inventive system and method can be readily utilized in conjunction with storage and selective dispensation of any beverage or liquid substance as a matter of design choice or necessity without departing from the spirit of the inventions. Similarly, while the inventive system and method are described as being operable for use with WinB products, in some embodiments, virtually any anaerobic compressible liquid volume may be readily substituted or even integrated into the pressurized chamber (e.g., as a lining, etc.).

FIG. 1 is an illustrative diagram of a dispensing system 100 capable of storing and dispensing beverages or food-like substances according to some embodiments. The dispensing system 100 includes a pressurized container 22_a_ (e.g., an airtight high-pressure seal rated tank, vessel, or equivalent) for storing a compressible liquid volume 28 (e.g., a flexible WinB product) within a pressurized environment 22_b_. The compressible liquid volume 28 includes a volume interface 32 (e.g., a nozzle or equivalent) for accessing the liquid stored therein. The volume interface 32 may be configured to provide a sealed/airtight connection to a releasable coupling 30 (such as a connector/compression filling), which in turn connects the compressible liquid volume 23 to a conduit 44_a_/44_b_. In some embodiments, each pressurized container 22_a_ is capable of storing any number of compressible liquid volumes 28.

In some embodiments, the pressurized container 22_a_ may be a pressurized canister/cartridge 16, having the various pressurized container interfaces 40_a_, 40_b_ (and optionally 40_c_), which may be positioned, sized, and configured to align with and "plug in" (or otherwise securely couple) to corresponding transport conduits.

While the volume interface 32 and the releasable coupling 30 may be preconfigured to readily form a releasable sealed connection, the releasable coupling 30 may optionally include a "universal adapter" component, operable to enable the adaptive releasable coupling 30 to form a secure sealed (but releasable) connection with virtually any variation of the volume interface 32.

The releasable coupling 30 may also include a releasable sealed connector element operable to form a releasable connection with the conduit 44_a_ so that the conduit 44_a_ can be readily disconnected. The sealed connector element of the releasable coupling 30 may include a releasable adaptive pressurized filling that increases in strength and reliability in response to an increase in the pressure that is exerted in the dispensing system 100 (e.g., such as a pressurized "O-Ring" fitting).

It may be appreciated that the use of such releasable adaptive pressurized fillings may be used in any number of components of the dispensing system 100 in which connections with various conduits are made. For example, the releasable adaptive pressurized fillings may be utilized in pressure container interfaces 40*a* and 40*b* (and in optional pressure container interface 40*c*), in an optional splitter 52 (e.g., a 1-way diverter valve), and in numerous other connections involving the various pressurization conduits 42*a*, 42*b*, 42*c*, and 42*d*, and the various liquid transport conduits 44*a*, 44*b*, and 44*c*. The releasable adaptive pressurized fillings may be utilized to release connections and replace components (e.g., interfaces and/or conduits).

In some embodiments, the pressure container interface 40*b* and the optional pressure container interface 40*c* include 1-way check valves (or combination control and 1-way check valves). While the liquid transport conduits 44*a*, 44*b*, and 44*c* may be of any sterile materials, they may be composed of flexible material that will enable the dispensing system 100 to take advantage of the "hammer effect" to increase the speed of the liquid or food (e.g., soft serve) being dispensed therethrough.

In some embodiments, the various conduits utilized in connection with the dispensing system 100 comprise reliable, preferably flexible, tubing or equivalent, which may be composed of plastic, related materials (e.g., polymers, etc.), and/or from suitable metal(s).

In some embodiments, conduits utilized in the dispensing system 100 may have uniform characteristics, whether employed for pressurization or for liquid transport functions. For example, conduits may have uniform characteristics when the conduits must be composed of non-reactive food-safe materials. Utilizing uniform characteristics in two or more conduits may simplify the dispensing system 100 maintenance and upkeep (e.g., since replacement conduits for either purpose may be readily cut and deployed as needed).

In some embodiments, conduits utilized in the dispensing system 100 may have different characteristics, depending on whether they are employed for pressurization (e.g., conduits 42*a*, 42*b*, 42*c*, and 42*d*), or for liquid transport functions (e.g., conduits 44*a*, 44*b*, and 44*c*). In this case, the pressurization conduits may not need to be food-safe and may be more robust (such as, through the use of metal tubing), while the liquid transport conduits may be composed of non-reactive food-safe materials.

It may be appreciated that utilizing flexible materials for the liquid transport conduits 44*a*, 44*b*, and 44*c* enables the dispensing system 100 to take advantage of the "hammer effect" to increase the speed of the liquid being dispensed therethrough. Depending on their length, the liquid transport conduits 44*b* and 44*c* may each include one or more corresponding controllable valves 46*a*, or 46*b*, 46*c*, respectively, which may be controllable 1-way valves, conventional 1-way check valves, or a combination thereof. Examples of such valves may be solenoid valves that are remotely controllable by a controller (discussed herein). Optionally, one or more diverter valves may be included in one or more of the liquid transport conduits 44*b* and 44*c* to minimize the amount of liquid that can remain therein following each time the dispensing system 100 dispenses the liquid.

Optionally, one or more additional compressible liquid volumes 50 may be stored inside the pressurized container 22*a*, and also subject to the pressurized environment 22*b* during the operation of the dispensing system 100. The size and quantity of such additional compressible liquid volume (s) 50 may be selected as a matter of design choice (e.g., based on the size of the selected pressurized container 22*a*).

In some embodiments, one of the compressible liquid volumes 50 may be filled with a cleaning solution for cleaning and sanitizing the liquid transport conduits 44*b* and 44*c*, with the interface element 40*c* comprising a controllable 1-way diverter valve and being positioned in-line in conduit 44*a*. In one example, when activated by a local dispensing control system 48*a*, the dispensing system 100 passes the cleaning solution from the compressible cleaning solution volume 50 through the same conduits, valves and related components as the main liquid being dispensed therethrough, thereby cleaning all or parts of the dispensing system 100. The cleaning function can be controlled by the local dispensing control system 20*a* and/or can occur automatically in accordance with a predefined schedule and/or automatically after a certain number of dispensing cycles and can also be activated manually.

The pressurized container 22*a* may include an access component 22*c* (such as an airtight cover), that when opened, enables installation, removal, and/or replacement of any number of compressible liquid volume(s) 28 and/or compressible liquid volume(s) 50. When sealed, the access component 22*c* may enable a controllable pressure system 8 to generate and maintain the desired pressurized environment 22*b* during the operation of the dispensing system 100.

In various embodiments, the controllable pressure system 18 includes a pressure source 34 (such as a compressor, an air pump, or an equivalent thereof) connected, via pressurization conduit(s) 42*a*, 42*b*, to a pressure regulator 38*a*. The pressure regulator 38*a* may be operable to control the operation of the pressure source 34 to adjust the pressurized environment 22*b*, as needed, via a pressurization conduit 42*c* that forms a pressurized seal with the pressure container interface 40*a*.

After configuration of the desired settings and parameters, the pressure regulator 38*a* may operate automatically in accordance with its settings and parameters. In an alternate embodiment, a pressure regulator 38*b* (having equivalent functionality to the pressure regulator 38*a*), or its features may be integrated into the pressure source 34 (e.g., instead of using the pressure regulator 38*a* or in addition thereto, for example for enabling backup/failsafe system operation in case of the failure of pressure regulator 38*a*).

In some embodiments, the controllable pressure system 18 also includes a pressure stabilizer 36 positioned between pressurization conduits 42*a* and 42*b*. The pressure stabilizer 36 may "store" pressurization generated by the pressure source 34, and thereby support the operation of the pressure regulator 38*a* by serving as an interim "on-demand" source of pressure for the pressure regulator 38*a* without needing to intermittently activate/engage the pressure source 34. Optionally, the pressure stabilizer 36 may serve as an interim pressure source for another pressure regulator of dispensing control system (not shown) via the pressurization conduit 42*d*, such that the dispensing control system may share the pressure source 34 and the pressure stabilizer 36 with the dispensing system 100.

The controllable pressure system 18, and the various components thereof (34, 36, 38), may be readily controllable from a variety of devices/systems operable to generate and maintain the pressurized environment 22*b* within the desired parameters. The controllable pressure system 18 can utilize inert gases or non-reactive gases or another fluid, such as compressed air and/or compressed $CO_2$ tanks. In some embodiments, the pressure force for the controllable pressure system 18 may be generated through gravity, via one or more preconfigured compressed air/gas containers, or through other non-pumping means, and/or through the introduction of $CO_2$ into the pressure regulator 38*a*.

The dispensing system 100 may include the local dispensing control system 20*a*, which may comprise one or more of the following:

(1) a controllable valve 46*a* (e.g., a solenoid or other electromechanical valve) coupled to the compressible liquid volume 28 via the liquid transport conduit 44*b*, the container interface 40*b*, and the liquid transport conduit 44*a* (preferably with a way check valve capability).

(2) an optional local dispensing control system 48*a* that includes one or more of the following:

(a) an electronic data processing system operable to execute program/control instructions. The electronic data processing system may be implemented in virtually any configuration ranging from a solid-state electronic controller to a computerized system that is operable to independently control multiple electromechanical devices and to optionally interface with a more comprehensive liquid dispensing management system (for example, such as disclosed in the above-incorporated '491 application). In some embodiments, the electronic data processing system, is capable of receiving control signals from a user interface of the local control system or a mobile computing device (e.g., smartphone or tablet) with a software application installed thereon capable of remotely controlling the dispensing system 100.

(b) one or more suitable electromechanical control components operable, in response to the electronic data processing system, to control electromechanical valves such as the controllable valve 46*a* (and optionally one or more additional controllable valve (s) 46*b*, 46*c* if the optional additional compressible liquid volume 50 is employed). The one or more suitable electromechanical control components may optionally control other electromechanical devices (for example, such as one or more components of the controllable pressure system 18, a dispensing interface, etc.).

(c) one or more graphical user interface operable to receive input from a user of the dispensing system. The graphical user interface may include a graphics display unit such as a touchscreen monitor. In some embodiments, the graphical user interface may include physical buttons. The user may interact with the graphical user interface to execute program/control instruction, such as a request for the dispensing system to dispense a glass of red wine.

(d) optionally a remote controller component, which may include a mobile device with a corresponding software application comprising a graphical user interface installed thereon. The user may interact with the graphical user interface of the software application to remotely control various aspects of the dispensing system 100, such as the controllable pressure system 18 or the one or more of the controllable valves to allow the dispensing system 100 to dispense a particular beverage or food-like substance or a particular combination of beverage or food-like substance from one or more of the compressible liquid volume 28 of the dispensing system 100.

In some embodiments, the local dispensing control system 20*a* is coupled to a dispensing interface 14*a* via the liquid transport conduit 44*c*.

If one or more optional additional compressible liquid volume(s) 50 are employed, the dispensing system 100 may include one or more optional dispensing control system(s) 20*b*, having a local control system 48*b* and a controllable valve 46*c* (each of which may be provided in any of a variety of configurations described above in connection with the local dispensing control system 48*a*, and the controllable valve 46*a*). The optional local dispensing control system 20*b* may be coupled to a dispensing interface and is operable to dispense the liquid from the compressible liquid volume(s) 50 therethrough.

In some embodiments, the local dispensing control 48*b* includes a graphics display unit such as a touchscreen monitor. The touchscreen monitor, and/or physical buttons may be situated or placed directly on the dispensing system 100. The user may interact with the graphical user interface to control one or more aspects of the dispensing system 100, including controllable pressure system 18.

Optionally, one or more stand-alone controllable valve(s) 46*b* are controllable by the local dispensing control system 20*a* (and/or by the local dispensing control system 20*b*, if present), without the need for a dedicated control system. As is shown in FIG. 1 by way of example, the stand-alone controllable valve 46*b* may be used in conjunction with the additional compressible liquid volume 50 and the optional splitter 52 to execute rapid metered pours from the compressible liquid volume 50 to the dispensing interface 14*a*. It may be appreciated that the local dispensing control system 20*b* may be operable to simultaneously execute rapid metered pours from the compressible liquid volume 50 to the dispensing interface 14*b*. Optionally, the above functions can be implemented utilizing a Y-adapter manifold.

Optionally, the local dispensing control system 20*a* (and/or of the local dispensing control system 20*b*) may be connected to the controllable pressure system 18 (or to individual components thereof), such that it may be operable to provide any necessary control functions, such as pressure maintenance/regulation. In some embodiments, when activated (for example, from the dispensing interface 14*a* through a link therewith), the local dispensing control system 20*a* may instruct the controllable pressure system 18 to briefly increase the level of pressure in the pressurized environment 22*b* for all (or for a portion of the duration of a dispensing period) to provide additional force and velocity to the liquid being expelled from the compressible liquid volume 28 (for example if the dispensing interface 14*a* is particularly distant from the pressurized container 22*a*), thus temporarily modifying the predefined pressure vs. time algorithm(s).

In some embodiments, the pressurized container 22*a* may be positioned in a temperature-controlled environment 54 that is suitable for temperature-stable storage of the liquid being dispensed from the compressible liquid volume 28 (and/or from the compressible liquid volume 50). The temperature-controlled environment 54 may be passive (such as a cellar/basement), active (such as a refrigerated housing (or refrigerated jacketing or coils positioned around the pressurized container 22*a*), a cold plate (or equivalent), or ice (or equivalent freezable cold elements) positioned proximally to the pressurized container 22*a* (such under the bottom thereof), or a combination of one or more of the above (such as a climate-controlled wine cellar). Additionally, an individual temperature control component (such as a cooling jacket around a wine bag) may be positioned surrounding any liquid volume stored in the pressurized container 22*a* to lower temperatures for optimal storage (e.g., the compressible liquid volume 28 and/or 50).

In some embodiments, the dispensing system 100 dispenses beverages or food-like substances based on dispensing profiles received from the local dispensing control system 48*a* or a remote controller component. The dispensing profile may be predetermined or customized as needed. Based on the dispensing profile, the local dispensing control system 48*a* or the remote controller component may open the controllable valve for a particular period of time to enable the flow of the liquid from the compressible liquid volume 28 through the liquid transport conduit for the particular period of time such that it corresponds with the quantity specified in the dispensing profile.

Figure 2:
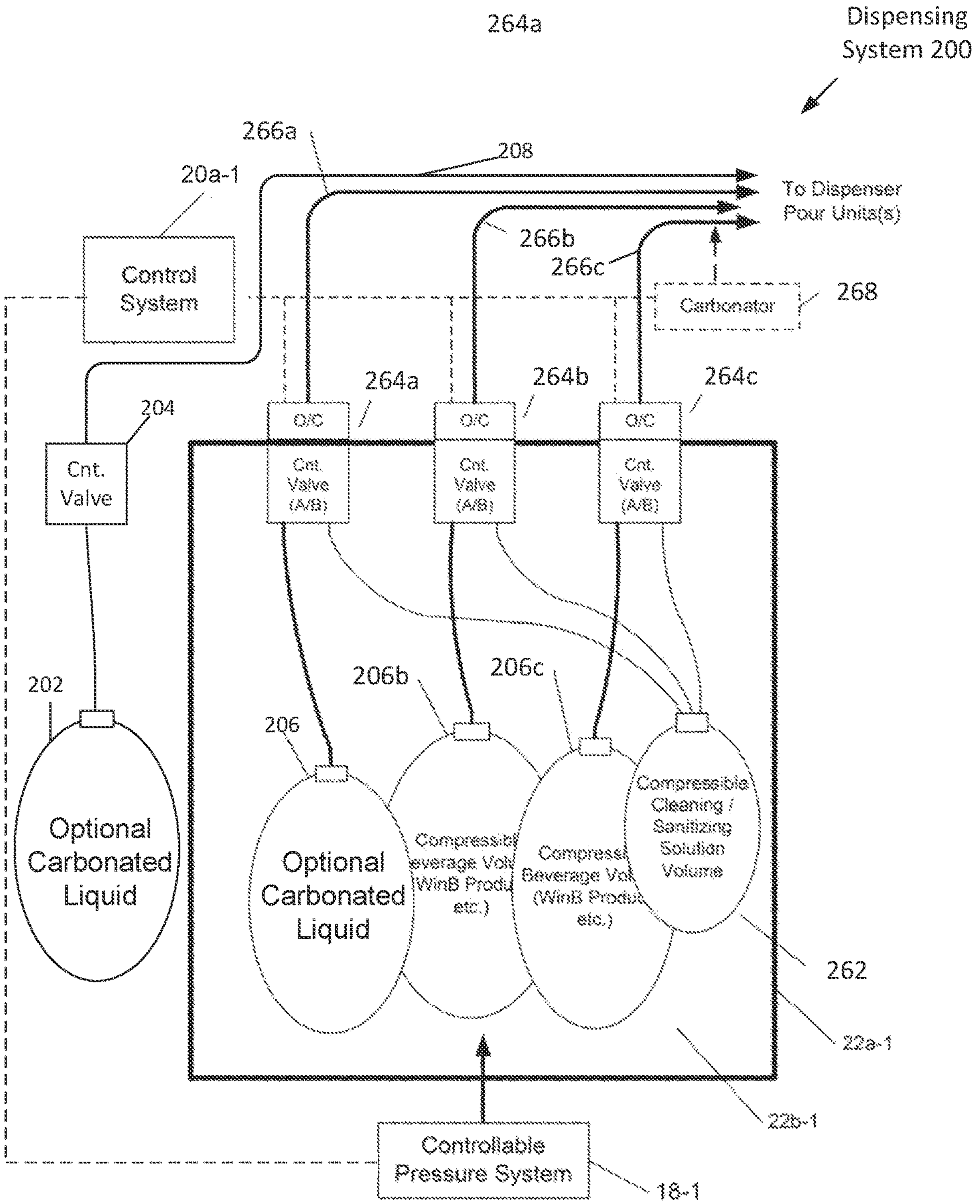
FIG. 2 is an illustrative diagram of a dispensing system capable of storing and dispensing beverages or food-like substances with an optional carbonated liquid according to some embodiments.

FIG. 2 is a diagram of a dispensing system 200 capable of storing and dispensing beverages or food-like substances with an optional carbonated liquid according to some embodiments. The dispensing system 200 is an alternate embodiment of the dispensing system 100 of FIG. 1. The dispensing system 200 includes elements 18-1, 20*a*-1, 22*a*-1, and 22*b*-1, corresponding to their counterpart elements 18, 20*a*, 22*a*, and 22*b* shown in FIG. 1. The dispensing system 200 may include a plurality of outgoing dispensing conduits (266*a*-266*c*), one for each stored compressible liquid volume that is operable to launch the beverage or food-like substance stored therein through a corresponding plural dispensing conduit connected thereto via a set of controllable A/B Open/Close solenoids 264*a*-264*c*.

It will be appreciated that one or more of the liquid volumes may include any kind of liquid (e.g., wine, carbonated water, mixers, or the like). For example, the compressible liquid volume 206 may contain carbonated water or other liquid. The controllable A/B Open/Close solenoid 264*a* may control the flow of the carbonated liquid (e.g., carbonated water) from the compressible liquid volume 206. The local dispensing control system 20*a*-1 may control the release of the carbonated liquid in a manner similar to the liquids in the other compressible liquid volumes 260*b* and 260*c*. The compressible liquid volume 206 may be similar to the other compressible liquid volumes 260*b* and 260*c*.

It will be appreciated that the carbonated liquid (or any liquid, food, or mixer) may be stored in a separate container outside the pressurized system. In one example, the carbonated liquid may be stored in container 202, which is controlled by a separate control valve 204. Liquid conduit 208 may provide carbonated liquid.

In some embodiments, container 202 includes water that is coupled (e.g., via the liquid conduit 208) with the carbonator 268, which may provide gas to create carbonated water. In some embodiments, carbonated water is stored separately (e.g., from the container 202 or a faucet), and the carbonator 268 may be combined with any number of dispensing conduits to carbonate the liquid(s) stored in the compressible liquid volumes 260*b* and/or 260*c*.

In some embodiments, the dispensing system 200 includes a cleaning/sanitizing feature, implemented as a compressible cleaning/sanitizing solution volume 262 that can be utilized to clean any of the dispensing conduits 266*a*-266*c*, when the local dispensing control system 20*a*-1 selectively activates each individual A/B—Open/Close solenoid 264*a*-264*c*, one at a time, to close off a corresponding stored to connect the compressible cleaning/sanitizing solution volume 262 to each corresponding dispensing conduit 266*a*-266*c*, and to perform cleaning/sanitization by running a cleaning cycle therethrough. At the conclusion of the cleaning process, the local dispensing control system 20*a*-1 causes A/B—Open/Close solenoids 264*a*-264*c* to select the connections to the compressible liquid volumes 206, 206*b*, and 206*c*).

In some embodiments, a local carbonator component 268 may be operable through the local dispensing control system 20*a*-1 (or remotely from the BMS control system 6) to selective provide carbonated water or gas to one or more of the dispensing conduits 266*a*-266*c*. The carbonator 268 may be operable to selectively add carbonation to any beverage being dispensed, thus providing an operating establishment with the option of selectively converting standard wine pours into sparkling wine pours thereby enabling the operating establishment to create and offer Champagne-type pours from applicable varietals (e.g., pinot noir, chardonnay), as well as to create Prosecco or Durello inspired pours, or carbonated pours of any other varietal (Shiraz, etc.).

Carbonation may be accomplished by injecting a carbonation medium (for example, $CO_2$ from a carbonation source, such as a $CO_2$ tank connected to a dispensing conduit through a remotely controllable valve). The local dispensing control system 20*a*-1 may adjust carbonation pressure levels (and optionally other carbonation-related settings) in response to a control signal (which may be received either programmatically for a specific predefined "blended drink recipe") received from the local dispensing control system 48*a*, or remotely controllable from a software application.

In some embodiments, adjustment of other "carbonation-related" settings may include, for example, the option of adding a small amount of carbonic acid in the case the carbonated product is intended to be subsequently used in a mixer, as an ingredient in a mixed wine-based drink (such as a Bellini). The addition of carbonic acid for such purposes may improve the end product and permit the operating establishment to add more ice to the end product, increasing their per-product served revenue. In various embodiments, a carbonation functionality may be advantageously operable from a dispenser pour unit control interface, the local dispensing control system 48*a*, or remotely controllable from a software application.

In some embodiments, dispenser pour units may include a blended pour capability. The carbonation function can be utilized in combination therewith to produce blended carbonated pours in accordance with one or mere pre-configured blended carbonated pour profiles or on an ad hoc basis.

It may be appreciated that a mixer, food, or drink may be provided in a manner that is similar to that which is discussed with regard to carbonation. For example, the compressible liquid volume 206 may contain wine, spirits, carbonated water, mixers, or the like.

The controllable A/B Open/Close solenoid 264*a* may control the flow of the wine, spirits, carbonated water, mixers, or the like. The local dispensing control system 20*a*-1 may control the release of the wine, spirits, carbonated water, mixers, or the like in a manner similar to the liquids in the other compressible liquid volumes 260*b* and 260*c*. The compressible liquid volume 206 may be similar to the other compressible liquid volumes 260*b* and 260*c*.

It will be appreciated that the wine, spirits, carbonated water, mixers, or the like may be stored in a separate container outside the pressurized system. In one example, the wine, spirits, carbonated water, mixers, or the like may be stored in container 202, which is controlled by a separate control valve 204. Liquid conduit 208 may provide carbonated liquid.

In some embodiments, a separate compressible volume (e.g., within the pressure environment or outside of it) containing wine, spirits, carbonated water, mixers, or the like may be controlled (e.g., the contents dispensed) through the local dispensing control system 20*a*-1 (or remotely from the BMS control system 6) to selective provide wine, spirits, carbonated water, mixers, or the like to one or more of the dispensing conduits 266*a*-266*c*.

The dispensing control system 20*a*-1 may selectively dispense any amount or combination of the wine, spirits, carbonated water, mixers, or the like for single drinks, mixed drinks, or the like.

In some embodiments, adjustment of other "mixer" settings may include, for example, the option of adding a small amount of two or more of wine, spirits, carbonated water, mixers, or the like to pour a mixer or to mix with other liquids (e.g., by the bartender or with liquids from other compressible volumes).

In some embodiments, dispenser pour units may include a blended pour capability. The function can be utilized in combination therewith to produce blended wine, spirits, carbonated water, and/or mixer pours in accordance with one or mere pre-configured blended pour profiles or on an ad hoc basis.

Figure 3:
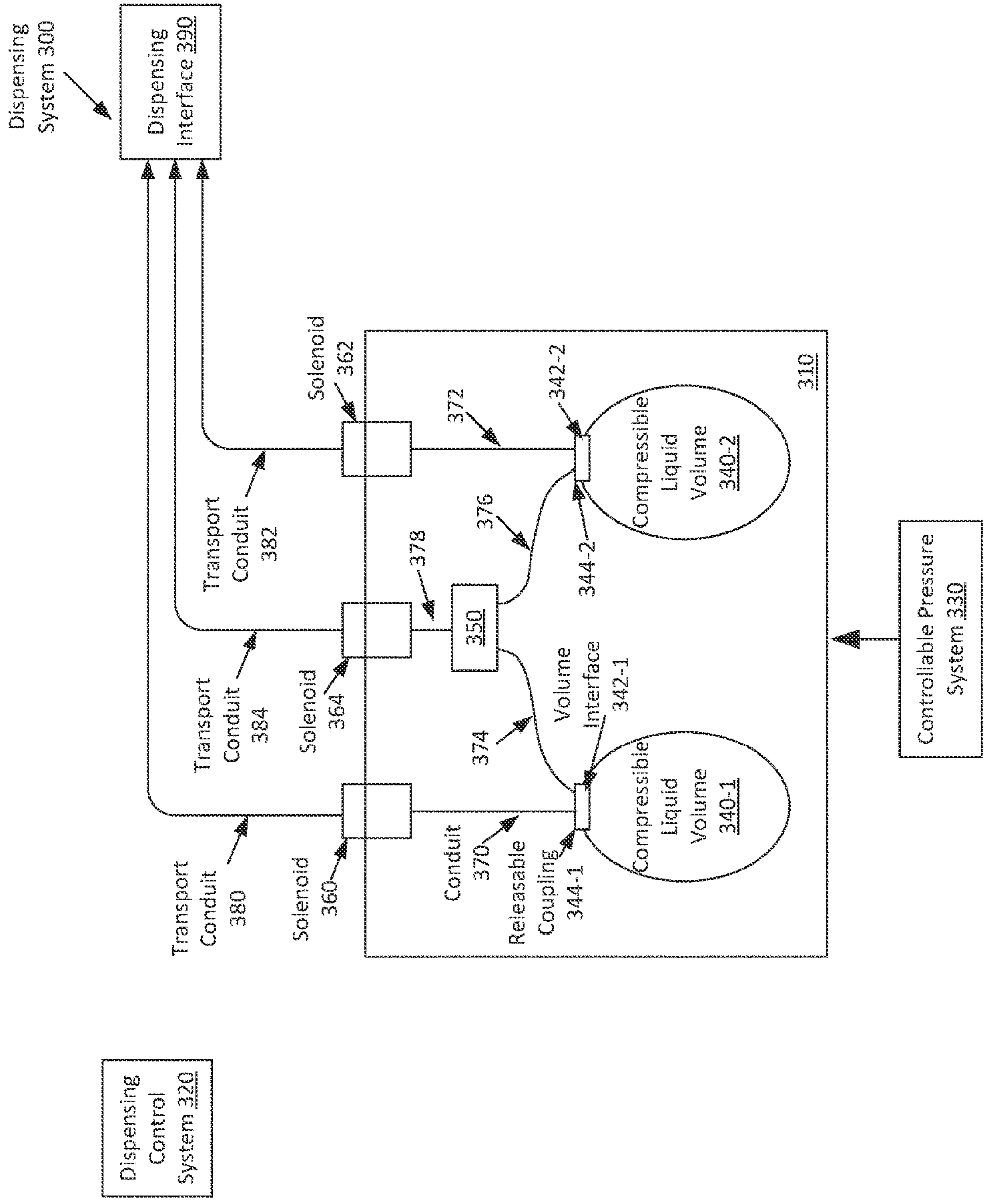
FIG. 3 is an illustrative diagram of a dispensing system capable of storing and dispensing beverages or food-like substances with an internal mixing component according to some embodiments.

FIG. 3 is an illustrative diagram of a dispensing system 300 capable of storing and dispensing beverages or food-like substances with an internal mixing component according to some embodiments. The dispensing system 300 includes a pressurized canister/cartridges 310, a dispensing control system 320, a controllable pressure system 330, and a transport system. The transport system may include solenoids 360, 362, and 364, transport conduits 380, 382, and 384, and a dispensing interface 390. In some embodiments, the pressurized canister/cartridge 310 includes compressible liquid volumes 340-1 and 340-2 (individually, collectively, the compressible liquid volume 340). In some embodiments, the compressible liquid volume 340 contains liquids or beverages such as wine, concentrated caffeinated beverages such as soda or coffee, hard lemonade, soft serve, mixers, components for mixed drinks (e.g., orange juice, lemon juice, lime juice, crème, and cream) and/or the like. In various embodiments, the compressible liquid volume 340 contains carbonated liquid.

In some embodiments, one or more of the compressible liquid volumes 340 may be filled with beverage or food items such as custard, yogurt, ice cream, soft serve, and the like. In various embodiments, the compressible liquid volume 340 contains chocolate flavoring, sugar syrup, fruit syrups, or coffee syrup for various types of beverages or food items. In one example, the compressible liquid volumes 340 may contain syrups or sauces for soft serve or other foods. In some embodiments, the compressible liquid volume 340-2 may contain, or be filled with water, detergent, or a cleaning solution to clean or sanitize conduits 372 and 376 of the pressurized canister/cartridge 310.

The pressurized canister/cartridge 310 may include compressible liquid volumes 340-1 and 340-2 and an internal mixing mechanism 350. Each of the compressible liquid volumes 340-1 and 340-2 may include a volume interface for accessing the liquid stored therein, preferably configured for a sealed/airtight connection to a releasable coupling that in turn couples their corresponding connects the compressible liquid volume to a conduit. For example, the compressible liquid volume 340-1 includes a volume interface 342-1 (e.g., a nozzle or equivalent) for accessing the liquid stored therein. The volume interface 342-1 may be configured for a sealed/airtight connection to a releasable coupling 344-1, that in turn couples the compressible liquid volume 340-1 to a conduit 370. The conduit 370 may couple the compressible liquid volume 340-1 to a controllable A/B Open/Close solenoid 360. In some embodiments, each of the compressible liquid volumes 340-1 and 340-2 includes their respective solenoid 360 and 362. In various embodiments, one or more of the compressible liquid volumes 340-1 and 340-2 includes a sealed outlet port which couples to their respective solenoid 360 and 362, thereby eliminating the need for one or more of the conduits 370 and 372.

In some embodiments, the releasable coupler may include a mechanical flange or an actuator that forces the locking mechanism into an open state. In some embodiments, the locking mechanism may include the mechanical flange or actuator. In various embodiments, the process of coupling the releasable coupler to the locking mechanism opens the locking mechanism. The process of opening the locking mechanism may be manual or automated (e.g., opening the locking mechanism is in response to an electronic signal). In various embodiments, the mechanical flange or an actuator may be actuated (e.g., manually, or electronically) to close the locking mechanism. In various embodiments, the process of decoupling the releasable coupler from the locking mechanism closes the locking mechanism.

In some embodiments, the compressible liquid volume 340-1 may include a conduit 374 to couple the compressible liquid volume 340-1 to an internal mixing mechanism 350. As discussed herein, mixing of two or more components may occur in a mixing mechanism within the pressurized environment, a mixing mechanism outside the pressurized environment (discussed herein), at dispensing nozzles, or in a vessel (e.g., with a glass). The mixing mechanisms may include venturi systems, mixing chambers, nozzles of different sizes, and/or the like.

In some embodiments, the internal mixing mechanism 350 may include a transport conduit with different conduit diameters, such as a venturi tube. A venturi tube may include constrictions or a change in the diameter of the transport conduit in the form of a constricted or choke section of the transport conduit. The change in the diameter results in a reduction in pressure and in an increase in velocity of the fluid or liquid flowing through the constriction. The internal mixing mechanism 350 may receive as an input transport conduit 374 and 376, which are coupled to the compressible liquid volume 340-1 and 340-2, respectively, which may have a diameter that is the same or substantially the same. In various embodiments, the diameter of the transport conduits 374 and 376 may be different from each other. Regardless of the relative diameters of the diameter of the transport conduits 374 and 376, the diameter of these conduits may be greater than the diameter of the constricted or choke section of the internal mixing mechanism 350. The difference between the diameter of the input transport conduits and the constricted section of the internal mixing mechanism 350 allows for the increase in velocity of the fluid flowing through the constriction. The increase in velocity through this constriction may allow the fluid or liquid from the input transport conduits to mix or blend as it travels through the constriction. Further details of the venturi tube may be discussed in FIG. 5.

In various embodiments, the internal mixing mechanism 350 may be a mixing chamber. A mixing chamber may include a volume or space where mixing may occur. For example, a mixing chamber may be within an apparatus and coupled to two or more conduits that may provide different liquids, foods, mixing components, and/or the like. The different materials may be provided within the mixing chamber from the different conduits. In some embodiments, the different conduits may each include a mixing interface that interfaces between the particular conduit and the mixing chamber. Each mixing interface, in some embodiments, may be positioned to increase mixing. For example, each mixing interface may include a nozzle and/or have a smaller diameter to spray and/or disperse the liquids, foods, mixing components, and/or the like from the conduit into the mixing chamber (e.g., to provide more surface area for mixing and/or increase velocity of the liquids, foods, mixing components, and/or the like within the chamber. When two or more interfaces provide liquids, foods, mixing components, and/or the like in the chamber in this manner, mixing is promoted.

In some embodiments, the mixing interfaces may be positioned near the top of a spherical, ovoid, funnel, or horn shape and angled to a side such that the swirling action caused by gravity, the directions of the mixing interfaces, gravity, and internal surface of the mixing chamber encourages swirling of the liquids, foods, mixing components, and/or the like, to mix together.

The mixing chamber may include a blending cup configured as a funnel. The funnel may be coupled to the transport conduits 374 and 376 as inputs of the internal mixing mechanism 350. The funnel may include one or more mechanical components such as a whisk to blend the liquid of fluid inputted from the transport conduits 374 and 376. In some embodiments, the internal mixing mechanism 350 may include a rotating component equipped with vanes or blades or an impeller. The impeller may blend or mix the liquid of fluid inputted from the transport conduits 374 and 376. An output of the internal mixing mechanism 350 may be a transport conduit 378 coupled to an output of the funnel. The transport conduit 378 may be coupled to a controllable A/B Open/Close solenoid 364.

In various embodiments, one or more components of the internal mixing mechanism 350 may be controlled by the dispensing control system 320. For example, the dispensing control system 320 may receive controls signals from a local control system or a software application configured to control one or more aspects of the internal mixing mechanism 350, including the vanes, blades, or impeller.

The internal mixing mechanism 350 may include a heating or cooling component such as heating and/or cooling coils placed at a side of the internal mixing mechanism 350 to enable heating or cooling of the liquid volumes mixed or blended therewithin. In various embodiments, heating and/or cooling coils may be around one or more of the transport conduits 374, 376, and/or 378 to heat or cool one or more of the inputs or output of the internal mixing mechanism 350. The heating or cooling components may be controlled by the dispensing control system 320, which may receive control signals from a local control system, or a software application configured to control the dispensing system 300.

In various embodiments, the heating or cooling component may be controlled by the dispensing control system 320. For example, the dispensing control system 320 may receive controls signals from a local control system or a software application to increase or decrease the temperature of fluid or liquid in the internal mixing mechanism 350.

In some embodiments, a controllable valve such as a solenoid may be coupled between one or more of the transport conduits 374 and 376 and the inputs of the internal mixing mechanism 350 to selectively couple one or more of the compressible liquid volumes 340-1 and 340-2 to the internal mixing mechanism 350. The controllable valve may be remotely controllable by one or more control signals received from the dispensing control system 320 of the dispensing system 300. In some embodiments, the dispensing control system 320 may receive control signals to remotely control one or more controllable valves of the dispensing system 300, including controllable vales coupled between one or more of the transport conduits 374 and 376 and the inputs of the internal mixing mechanism 350. The dispensing control system 320 may receive these control signals from a mobile device with a software application configured to remotely control the dispensing system 300. An example of a user interface outputted by the mobile device may be seen in FIG. 10A.

The dispensing control system 320 may control various aspects of the dispensing system 300, such as the pressurized canister/cartridge, temperature, dispensing profiles, user profiles, solenoid valves, and dispensing interface.

When a user places a compressible liquid volume (such as WinB products) into the pressurized canister/cartridges 310, the user may interact with a graphical user interface to input properties of the compressible liquid volume to the dispensing control system 320. Properties may include the type of beverage/liquid (red wine, white wine, coffee, soft serve, etc.) and the viscosity of the beverage/liquid. The minimum required diameter of conduit required for the beverage/liquid, any temperature constraints (for example, soft serve may need to be kept below a certain temperature). In various embodiments, properties of the compressible liquid volume may be automatically or manually inputted to the dispensing control system 320 using other methods such as container IDs which may comprise labels (bar codes, QR codes, or RFID tags) (e.g., the dispensing control system 320 may utilize sensors to recognize a particular compressible container from a service provider by detecting NFC, RFID tags, sensor signals, and/or the like).

In some embodiments, the dispensing control system 320 may include pre-defined recipes for beverages and food items using one or more of the compressible liquid volumes of the pressurized canister/cartridges 310. The pre-defined recipe may specify an amount of each of the ingredients of the beverage or food item and an order with which to add or mix the ingredients. The dispensing control system 320 may utilize the pre-defined recipe to determine parameters such as a period of time and an amount of pressure to apply to the pressurized canister/cartridge by a controllable pressure system to allow liquid to be selectively dispensed through a normally locked dispensing conduit connected to the pressurized canister/cartridge. Furthermore, the dispensing control system 320 may utilize the pre-defined recipe to determine a length of time to selectively open one or more controllable solenoids or valves to allow one or more liquids to flow from the compressible liquid volume in the pressurized canister/cartridge through its respective transport conduit, and to a dispensing interface. In various embodiments, a profile is generated for each recipe that indicates and assists to provide control signals to the solenoids or valves (e.g., to open and/or close the specific solenoids or valves and control pressure to provide the desired drink or food). Profiles may be created based on the recipe by the dispensing control system 320 and/or uploaded or downloaded by a remote system or a local system of a service provider.

In some embodiments, one or more liquids may flow to an internal or external mixing mechanism before arriving at the dispensing interface. In some embodiments, the dispensing control system 320 (e.g., using or creating a profile) may determine a length of time to activate the internal or external mixing mechanism and a speed function of the internal or external mixing mechanism. The dispensing control system

320 may determine these parameters based on at least a viscosity of the liquid contained within the compressible liquid volume and the diameter of the conduit coupled to the compressible liquid volume.

In some embodiments, the dispensing system 300 may receive customized recipes for beverages or food items using one or more of the compressible liquid volumes of the pressurized canister/cartridges 310. The customized recipe may specify an amount of each of the ingredients of the beverage or food item and an order with which to add or mix the ingredients. In some embodiments, when the dispensing system 300 receives a request from a user for a customized or pre-defined recipe, the dispensing control system 320 may determine if all the ingredients of the customized or pre-defined recipe are available in the dispensing system 300. If one or more ingredients are missing, or if there is an insufficient amount of one or more ingredients, the dispensing control system 320 may send a notification to the user informing the user that the recipe cannot be made.

For the purposes of tracking inventory and anticipated service, in some embodiments, the dispensing control system 320 may track and estimate when a compressible liquid volume may need to be replaced. In some embodiments, the dispensing control system 320 utilizes information external to the dispensing system 300. For example, for a dispensing system 300 which dispenses soft serve, the dispensing system 300 may receive information from weather forecasting systems. If the dispensing system 300 receives information from the weather forecasting systems that a prolonged period of hot weather is forecasted for the following week, the dispensing system 300 may notify the user of increased potential demand for additional soft serve and other cold beverages via the display of the dispensing system 300 or a mobile device with a corresponding software application comprising a graphical user interface installed thereon. In some embodiments, the dispensing control system 320 may receive this information from an inventory management system that is external to the dispensing system 300.

In some embodiments, an external system (e.g., an inventory management system 930) may track external factors (e.g., weather and local events) and/or historical information (e.g., past sales and consumption from a venue or one or more venues that are proximate to each other), to make recommendations. The recommendations may be based in part on tracking consumption of liquids, foods, mixing components, and/or the like by the dispensing system 320.

The dispensing control system 320 may measure and track the number of beverages or food items being dispensed from the dispensing system 300. This information may be useful for the purposes of inventory tracking as well as invoicing. For example, an owner of the dispensing system 300 may calculate a sum of money for a lease based on the number of beverages or food items (e.g., food-like substances) being dispensed over a period of time.

The dispensing control system 320 may track the usage of the dispensing system 300 to estimate or assess when service or tune-up may be required. In some embodiments, the dispensing control system 320 may send a notification to the display of the dispensing system 300 or a mobile device with a corresponding software application comprising a graphical user interface installed thereon if the dispensing control system 320 determines there is a malfunction of any of the components of the dispensing system 300 such as the conduit, solenoid, the controllable pressure systems 330, and the like.

In some embodiments, the dispensing control system 320 may determine the temperature of one or more pressurized canister/cartridges. For example, a pressurized canister/cartridge which stores yogurt may be kept at a temperature that is different from that of a pressurized canister/cartridge which stores coffee or wine. In this example, the dispensing control system 320 may control one or more temperature control elements (e.g., heating coils, cold plates, refrigerant, fans, and/or the like within the pressurized environment) to cool or heat different compressible volumes (or different, separately insulated sections within the pressurized environment.

In various embodiments, the pressurized canister/cartridge 310 is coupled to the controllable pressure system 330. The controllable pressure system 330 may be configured to provide direct pressurization to the compressible liquid volume stored therein to generate and maintain the pressurized environment within the necessary/desired parameters.

The controllable pressure system 330 may be controllable by the dispensing control system 320. For example, the controllable pressure system 330 may receive a request from a user of the local control system or from the mobile device with the software application configured to provide remote control to the dispensing system 300 to increase the level of pressure in a pressurized environment within the pressurized canister/cartridges 310 for all or a portion of the duration of a dispensing period to provide additional force and velocity to the liquid being expelled from the compressible liquid volume stored within the pressurized canister/cartridge 310.

In some embodiments, the transport conduits of the dispensing system 300 include conduits 370, 372, 374, 376, 380, 382, and 384. The conduits may be composed of plastic, plastic related materials (e.g., polymers), or metal(s). The diameter of the conduit for each of the compressible liquid volumes 340-1 and 340-2 may differ depending on the type of liquids, foods, mixing components, and/or the like stored therein. The diameter of the conduit may depend on the type of liquids, foods, mixing components, and/or the like stored therein (or the selection of the compressible container that contains liquids, foods, mixing components, and/or the like that may be coupled to a conduit may be based on the contents of the compressible container and the preferred diameter of the conduit). For example, if the compressible liquid volume 340-2 contains a sugar syrup, and the compressible liquid volume 340-1 contains a caffeinated beverage, the diameter of the conduit 374 may be greater than that of the diameter of the conduit 376 since the caffeinated beverage may be more popular and may be dispensed in greater quantity than the sugar syrup, thereby decreasing the time required to dispense the fluid or liquid.

The dispensing interface 390 may be coupled to the pressurized canister/cartridges 310 via transport conduits of the dispensing system 300. In various embodiments, the dispensing interface 390 may include a dispensing pour unit or a multi-pour nozzle. Further details regarding various embodiment will be discussed regarding FIGS. 7A through 8C.

In various embodiments, one or more different valves (e.g., one or more solenoid valves discussed herein) or interfaces (e.g., interfaces into mixing mechanisms or mixing chambers) may include one-way valves to prevent backflow (e.g., during or after pressure is no longer applied, valve(s) are closed, or valve(s) are opened).

Figure 4:
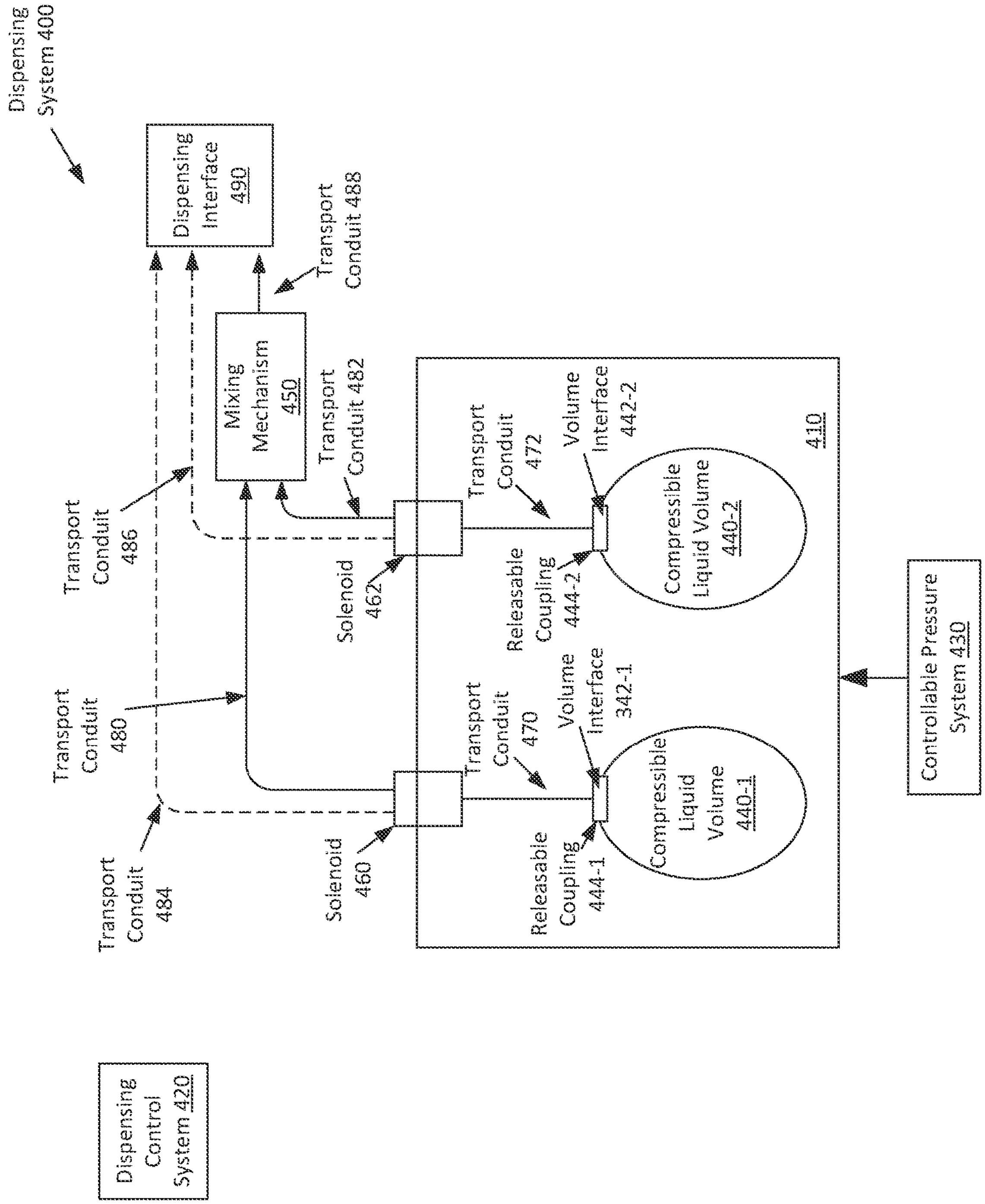
FIG. 4 is an illustrative diagram of a dispensing system capable of storing and dispensing beverages or food-like substances with an external mixing component according to some embodiments.

FIG. 4 is an illustrative diagram of a dispensing system 400 capable of storing and dispensing beverages or food-like substances with an external mixing component according to some embodiments. The dispensing system 400 includes a pressurized canister/cartridges 410, a dispensing control system 420, a controllable pressure system 430, and a transport system. The pressurized canister/cartridges 410 includes compressible liquid volumes 440-1 and 440-2 (individually, collectively, the compressible liquid volume 440). The transport system may include an external mixing mechanism 450, solenoids 460 and 462, transport conduits 480, 482, 484, and 486, and a dispensing interface 490.

The pressurized canister/cartridge 410 may include compressible liquid volumes 440-1 and 440-2. Each of the compressible liquid volumes 440-1 and 440-2 may include a volume interface for accessing the liquid stored therein. The volume interface(s) may be configured for a sealed/airtight connection to a releasable coupling that in turn couples their corresponding connects the compressible liquid volume to a conduit. For example, the compressible liquid volume 440-1 includes a volume interface 442-1 (e.g., a nozzle or equivalent) for accessing the liquid stored therein, preferably configured for a sealed/airtight connection to a releasable coupling 444-1, that in turn couples the compressible liquid volume 440-1 to a conduit 470. The conduit 470 may couple the compressible liquid volume 440-1 to a controllable A/B Open/Close solenoid 460. In some embodiments, each of the compressible liquid volumes 440-1 and 440-2 includes their respective solenoid 460 and 462. In various embodiments, one or more of the compressible liquid volumes 440-1 and 440-2 includes a sealed outlet port which couples to their respective solenoid 460 and 462, thereby eliminating the need for one or more of the conduits 470 and 472.

In some embodiments, a controllable valve such as a solenoid may be coupled between one or more of the transport conduits 480 and 482 and the inputs of the external mixing mechanism 450 to selectively couple one or more of the compressible liquid volumes 440-1 and 440-2 to the external mixing mechanism 450. The controllable valve may be remotely controllable by one or more control signals received from the dispensing control system 420 of the dispensing system 400. In some embodiments, the dispensing control system 420 may receive control signals to remotely control one or more controllable valves of the dispensing system 400, including controllable vales coupled between one or more of the transport conduits 480 and 482 and the inputs of the external mixing mechanism 450. The dispensing control system 420 may receive these control signals from a mobile device with a software application configured to remotely control the dispensing system 400. An example of a user interface outputted by the mobile device may be seen in FIG. 10A.

In some embodiments, the releasable coupler includes a mechanical flange or an actuator that forces the locking mechanism into an open state. In some embodiments, the locking mechanism may include the mechanical flange or actuator. The process of coupling the releasable coupler to the locking mechanism may open the locking mechanism. The process of opening the locking mechanism may be manual or automated (e.g., opening the locking mechanism is in response to an electronic signal). In various embodiments, the mechanical flange or an actuator may be actuated (e.g., manually, or electronically) to close the locking mechanism. In various embodiments, the process of decoupling the releasable coupler from the locking mechanism closes the locking mechanism.

In FIG. 4, the solenoid 460 couples the transport conduit 470 to transport conduits 480 and 484. In some embodiments, the solenoids 460 may be a three-way valve. The three-way valve may allow liquid or fluid to flow from the compressible liquid volume 440-1 to one or both of the transport conduit 480 or transport conduits transport conduit 484.

In some embodiments, the compressible liquid volume 440 contains liquids or beverages such as wine, concentrated caffeinated beverages such as soda or coffee, hard lemonade, soft serve, and/or the like. In various embodiments, the compressible liquid volume 440 contains carbonated liquid. In some embodiments, one or more of the compressible liquid volumes 440 may be filled with beverage or food items such as custard, yogurt, ice cream, soft serve, and the like. In various embodiments, the compressible liquid volume 440 contains chocolate flavoring, sugar syrup, fruit syrups, or coffee syrup for various types of beverages or food items. In one example, the compressible liquid volumes 440 may contain syrups or sauces for soft serve or other foods.

The dispensing control system 420 controls various aspects of the dispensing system 300, such as the pressurized canister/cartridge, temperature, dispensing profiles, user profiles, solenoid valves, and dispensing interface.

When a user places a compressible liquid volume (such as WinB products) into the pressurized canister/cartridges 410, the user may interact with a graphical user interface to input properties of the compressible liquid volume to the dispensing control system 420. Properties may include the type of beverage/liquid (red wine, white wine, coffee, soft serve, etc.), a viscosity of the beverage/liquid, minimum required diameter of conduit required for the beverage/liquid, and/or any temperature constraints (for example, soft serve may need to be kept below a certain temperature). In various embodiments, properties of the compressible liquid volume may be inputted to the dispensing control system 420 using other methods such as container IDs which may comprise labels (bar codes, QR codes, or RFID tags).

In some embodiments, the dispensing control system 420 may include pre-defined recipes for beverages and food items using one or more of the compressible liquid volumes of the pressurized canister/cartridges 410. The pre-defined recipe may specify an amount of each of the ingredients of the beverage or food item and an order with which to add or mix the ingredients. The dispensing control system 420 may utilize the pre-defined recipe to determine parameters for a profile for each recipe. Parameters may include a period of time and an amount of pressure to apply to the pressurized canister/cartridge by a controllable pressure system to allow liquid to be selectively dispensed through a normally locked dispensing conduit connected to the pressurized canister/cartridge. The dispensing control system 420 (or an external system as discussed herein) may determine these parameters based on at least a viscosity of the liquid contained within the compressible liquid volume and the diameter of the conduit coupled to the compressible liquid volume.

In some embodiments, the dispensing system 400 may receive customized recipes for beverages or food items using one or more of the compressible liquid volumes of the pressurized canister/cartridges 410. The customized recipe may specify an amount of each of the ingredients of the beverage or food item and an order with which to add or mix the ingredients. In some embodiments, when the dispensing system 400 receives a request from a user for a customized or pre-defined recipe, the dispensing control system 420 may determine if all the ingredients of the customized or pre-defined recipe are available in the dispensing system 400. If one or more ingredients are missing, or if there is an insufficient amount of one or more ingredients, the dispensing control system 420 may send a notification to the user (or another user such as a bartender) informing the user that the recipe cannot be made, requesting refills of one or more compressible volumes, and/or what the user (e.g., bartender or serving staff) may add to a drink or serving manually once dispensed by the dispensing system.

For the purposes of tracking inventory and anticipated service, in some embodiments, the dispensing control system 420 may track and estimate when a compressible liquid volume may need to be replaced. In some embodiments, the dispensing control system 420 utilizes information external to the dispensing system 400. For example, for a dispensing system 400, which dispenses soft serve, may receive information from weather forecasting systems, if the dispensing system 400 receives information from the weather forecasting systems that a prolonged period of hot weather is forecasted for the following week, the dispensing system 400 may notify the user of increased potential demand for additional soft serve and other cold beverages via the display of the dispensing system 400 or a mobile device with a corresponding software application comprising a graphical user interface installed thereon. In some embodiments, the dispensing control system 420 may receive this information from an inventory management system that is external to the dispensing system 400.

The dispensing control system 420 may measure and track the number and type of servings, the volume and type of liquids, foods, mixing components, and/or the like that are served, and/or the number of beverages or food items being dispensed from the dispensing system 400. This information may be useful for the purposes of inventory tracking, invoicing, and historical forecasting of trends and consumption. For example, an owner of the dispensing system 400 may calculate a sum of money for a lease based on the number of beverages or food items (e.g., food-like substances) being dispensed over a period of time.

The dispensing control system 420 may track the usage of the dispensing system 400 to estimate or assess when service or tune-up may be required. In some embodiments, the dispensing control system 420 may send a notification to the display of the dispensing system 400 or a mobile device with a corresponding software application comprising a graphical user interface installed thereon if the dispensing control system 420 determines there is a malfunction of any of the components of the dispensing system 400 such as the conduit, solenoid, the controllable pressure systems 430, and the like.

In some embodiments, the dispensing control system 420 may determine the temperature of one or more pressurized canister/cartridges. For example, a pressurized canister/cartridge which stores yogurt may be kept at a temperature that is different from that of a pressurized canister/cartridge which stores coffee or wine.

In various embodiments, the pressurized canister/cartridge 410 is coupled to the controllable pressure system 430. The controllable pressure system 430 may be selected and configured to provide direct pressurization to the compressible liquid volume stored therein to generate and maintain the pressurized environment within the necessary/desired parameters.

The controllable pressure system 430 may be controllable by the dispensing control system 420. For example, the controllable pressure system 430 may receive a request from a user of the local control system or from the mobile device with the software application configured to provide remote control to the dispensing system 400 to increase the level of pressure in a pressurized environment within the pressurized canister/cartridges 410 for all or a portion of the duration of a dispensing period to provide additional force and velocity to the liquid being expelled from the compressible liquid volume stored within the pressurized canister/cartridge 410.

In some embodiments, the external mixing mechanism 450 is coupled to the compressible liquid volume 440-1 via transport conduits 480 and 470 and compressible liquid volume 440-2 via transport conduits 482 and 472. The external mixing mechanism 450 may include a transport conduit with different conduit diameters, such as a venturi tube as discussed herein.

The external mixing mechanism 450 may receive as an input transport conduits 480 and 482, which are coupled to the compressible liquid volume 440-1 and 440-2 respectively, the diameter of the transport conduits 480 and 482 may be the same or substantially the same. In various embodiments, the diameter of the transport conduits 480 and 482 may be different from each other. Regardless of the relative diameters of the diameter of the transport conduits 480 and 482, the diameter of these conduits may be greater than a diameter of the constricted or choke section of the external mixing mechanism 450. The difference in the diameter between the input transport conduits and the constricted section of the external mixing mechanism 450 allows for the increase in velocity of the fluid flowing through the constriction. The increase in velocity of fluid flowing through this constriction may allow the fluid or liquid from the input transport conduits to mix or blend as it travels through the constriction.

In various embodiments, the external mixing mechanism 450 may be a mixing chamber as discussed herein. In some embodiments, the mixing chamber may include a blending cup configured as a funnel. The funnel may be coupled to the transport conduits 480 and 482 as inputs of the external mixing mechanism 450. Each of the transport conduits 480 and 482 may be coupled to solenoids 460 and 462, respectively. The funnel may include one or more mechanical components such as a whisk to blend the liquid of fluid inputted from the transport conduits 480 and 482. In some embodiments, the external mixing mechanism 450 may include a rotating component equipped with vanes or blades or an impeller. The impeller may blend or mix the liquid of fluid inputted from the transport conduits 480 and 482. An output of the internal mixing mechanism 350 may be a transport conduit 488 coupled to an output of the funnel.

In various embodiments, one or more components of the external mixing mechanism 450 may be controlled by the dispensing control system 420. For example, the dispensing control system 420 may receive controls signals from a local control system or a software application configured to control one or more aspects of the external mixing mechanism 450, including the vanes, blades, or impeller.

In one embodiment, the external mixing mechanism 450 includes a heating or cooling component such as heating and/or cooling coils placed at a side of the external mixing mechanism 450 to enable heating or cooling of the liquid volumes mixed or blended therewithin. In various embodiments, heating and/or cooling coils may be around one or more of the transport conduits 480, 482, and 488 to heat or cool one or more of the inputs or output of the external mixing mechanism 450. In various embodiments, the heating or cooling components may be controlled by the dispensing control system 420, which may receive control signals from a local control system or a software application configured to control the dispensing system 400.

In various embodiments, the heating or cooling component may be controlled by the dispensing control system 420. For example, the dispensing control system 420 may receive controls signals from a local control system or a software application to increase or decrease the temperature of fluid or liquid in the external mixing mechanism 450.

In some embodiments, the transport conduits of the dispensing system 400 include conduits 470, 472, 480, 482, 484, 486, and 488. Different compressible containers may be coupled to different conduits based on contents of the compressible container (e.g., viscosity and/or fats of the contained liquid, food, mixer, or the like) and the diameters of the different conduits. For example, if the compressible liquid volume 440-2 contains a sugar syrup, then the compressible liquid volume 440-2 may be coupled to transport conduit 472 (and transport conduit 482) because those conduits have a larger diameter than transport conduit 470.

The dispensing interface 490 may be coupled to the pressurized canister/cartridges 410 via transport conduits of the dispensing system 400. In various embodiments, the dispensing interface 490 may include a dispensing pour unit or a multi-pour nozzle. Further details regarding various embodiment will be discussed regarding FIGS. 7A through 8C.

In various embodiments, conduits coupled to compressible liquid volumes may deliver contents of the volumes to the mixing mechanism 450. If a single beverage is served (e.g., from compressible liquid volume 440-1), then the serving may be provided over one or more conduits, through the mixing mechanism 450, and to the dispensing interface 490. Alternately, in some embodiments, there may be separate conduits (e.g., transport conduits 484 and/or 486) which may bypass the mixing mechanism 450.

In some embodiments, a mixing chamber may be coupled to water, carbonated water, seltzer, a gas, or the like for cleaning the mixing chamber. The mixing chamber may also include, in some embodiments, a drain or a solenoid (e.g., controllable valve) that can drain or provide an escape for the water, carbonated water, seltzer, or a gas used to flush the mixing chamber. In some embodiments, periodically (e.g., after a period of time, a predetermined number of uses of the mixing chamber, or after every use of the mixing chamber), the dispensing control system 420 may control a source (e.g., through a pump and/or pressure system) to dispense the water, carbonated water, seltzer, or gas within the mixing chamber and to open the drain conduit (e.g., command the solenoid valve to open) to drain and/or remove the cleaning agent. In some embodiments, the drain or drain conduit may lead to a physical drain (e.g., in a sink) or a waste container that is periodically emptied.

Figure 5:
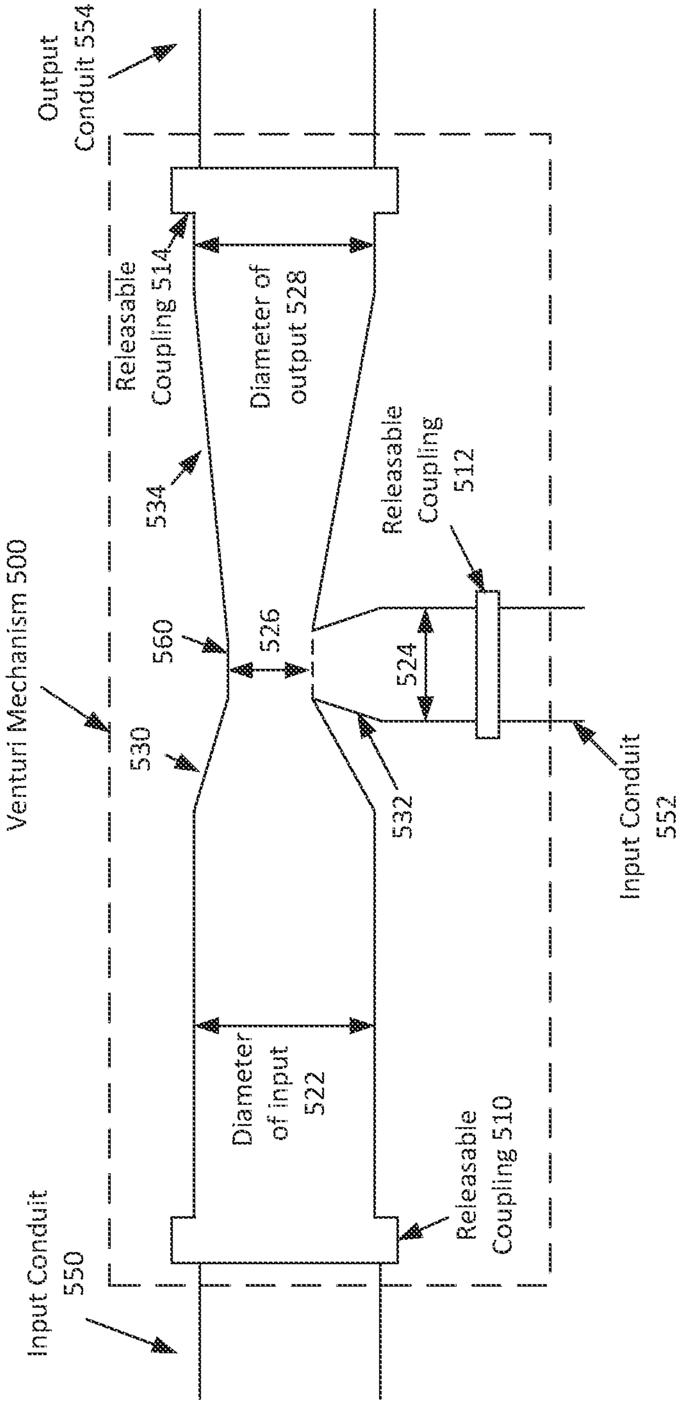
FIG. 5 is an illustrative diagram of an example mixing component according to some embodiments.

FIG. 5 is an illustrative diagram of an example mixing component such as a venturi mechanism 500 according to some embodiments. The venturi mechanism 500 includes input ports and one output port. In various embodiments, the venturi mechanism 500 may have any number of input ports and output ports. Each of the input ports of the venturi mechanism 500 may include releasable coupling 510 and 512, respectively. Similarly, the output port of the venturi mechanism 500 may include a releasable coupling 514. The releasable couplings 510, 512, and 514 may be configured to readily form a releasable sealed connection. In some embodiments, the releasable couplings 510, 512, and 514 include a universal adapter component, operable to enable the adaptive releasable coupling to form a secure sealed (but releasable) connection. In one embodiment, one or more of the releasable couplings 510, 512, and 514 further includes a releasable sealed connector element operable to form a releasable connection with their respective conduit so that it can be readily disconnected if replacement or either component is necessary. The sealed connector element of the releasable couplings 510, 512, and 514 comprises a releasable adaptive pressurized filling that increases in strength and reliability in response to an increase in the pressure that is exerted in the dispensing system (e.g., such as a pressurized "O-Ring" fitting).

The venturi mechanism 500 may include constrictions or a change in the diameter of the transport conduit in the form of a constriction or choke section of the transport conduit. An input conduit 550 may be releasably coupled to one input of the venturi mechanism 500, while another input conduit 552 may be releasably coupled to another input of the venturi mechanism 500. Similarly, an output conduit 554 may be releasably coupled to an output of the venturi mechanism 500. For example, each of a diameter 522 of the input and a diameter 524 of the output port may be greater than a diameter 526 of a constriction or choke section 560 of the venturi mechanism 500. A reduction of the diameter of the input ports to the constriction or choke section 560 results in a reduction in the pressure and in an increase in the velocity of the fluid or liquid flowing through the constriction, which allows the fluid or liquid from the input conduits to mix or blend. The diameter of the input transport conduit may be gradually reduced in sections 530 and 532 of the venturi mechanism 500 as the input transport conduit approaches the constriction or choke section 560 of the venturi mechanism 500. The diameter of the venturi mechanism 500 increases from the diameter 526 of the constriction or choke section 560 through to a diameter 528 of the output port in section 534. In some embodiments, the diameter 528 of the output port may be the same or substantially the same as one of the diameters of the input ports. In various embodiments, the diameter 528 of the output port may be different from one of the diameters of the input ports.

Figure 6:
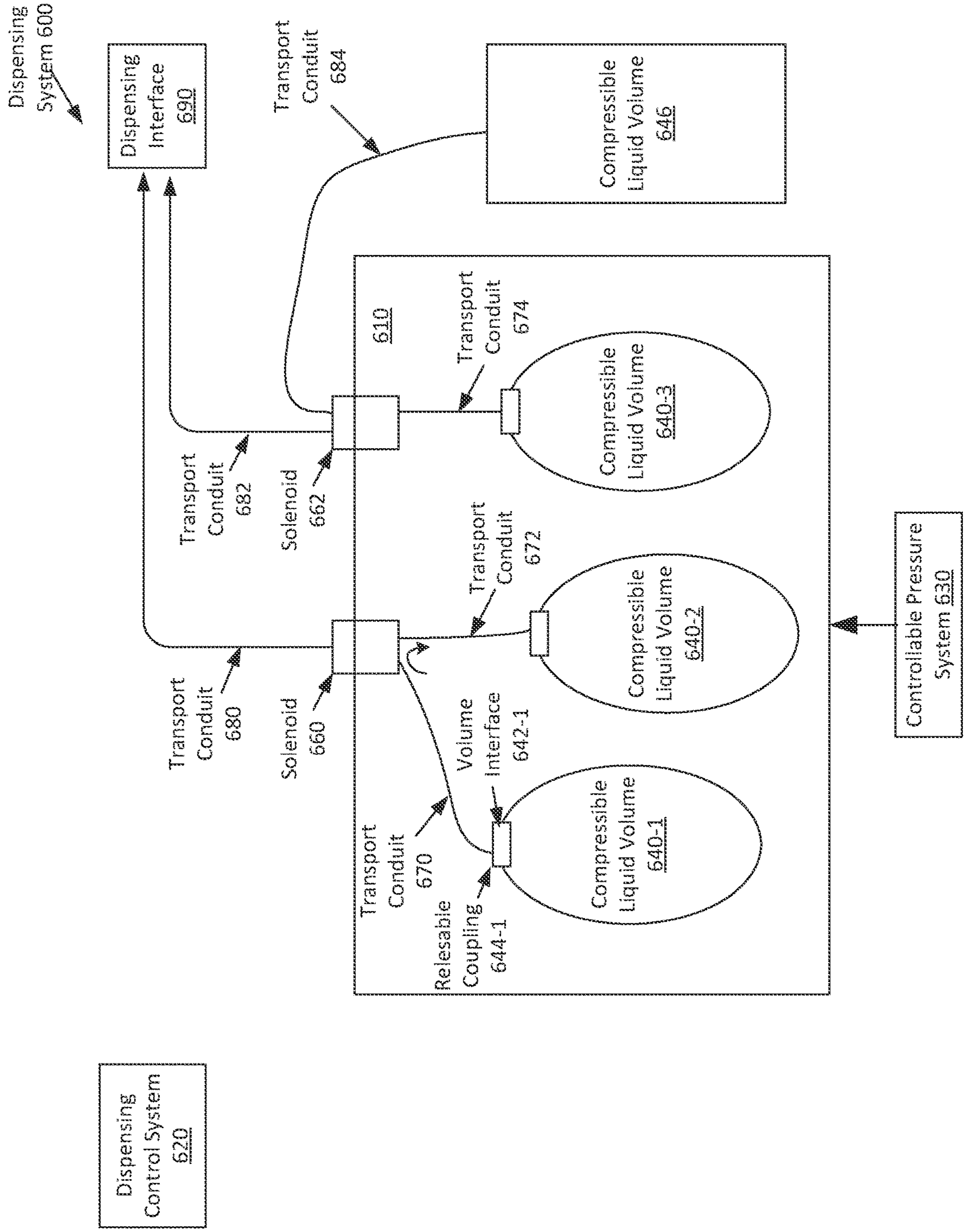
FIG. 6 is an illustrative diagram of a dispensing system capable of storing, dispensing, and refilling compressible liquid volume of beverages or food-like substances according to some embodiments.

FIG. 6 is an illustrative diagram of a dispensing system 600 capable of storing, dispensing, and refilling compressible liquid volume of beverages or food-like substances according to some embodiments. FIG. 6 depicts two different ways to refill a compressible liquid volume. In one example, a compressible liquid volume 640-2 may be refilled with the contents of compressible liquid volume 640-1. Compressible container 640-1 may also be contained within the pressurized environment of a pressurized container 610. The compressible container 640-1 may refill all or part of the compressible container 640-2 using a pump (not depicted in FIG. 6). In some embodiments, the compressible container 640-1 contains the same beverage, component, flavoring, or food-like substance of container 640-2. In some embodiments, the system may control the solenoid 660 (e.g., a solenoid) to direct the distribution of contents of the compressible container 640-1 when the content of the compressible container 640-2 is depleted (i.e., the compressible container 640-1 is utilized when compressible container 640-2 is depleted without refilling compressible container 640-2). In some embodiments, one or more of the solenoids 660 and 662 is a valve.

Transport conduits 670 and 672 may couple the valve 660 to the compressible container 640-1 and 640-2, respectively. Similarly, a transport conduit may couple the valve 662 to a compressible liquid volume 640-3.

In the example depicted in FIG. 6, valves 660 and 662 both act as valves and volume interfaces (e.g., on both sides of the pressurized container and configured such that they allow the pressure within the pressurized container to maintain pressure). The valves 660 and 662 may be solenoid valves that are electronically controllable. In one example, valve 662 is a three-way solenoid valve that may be controlled to allow the contents of compressible container 646 to be pumped into the compressible container 640-3. In other embodiments, the valve 662 may be outside or inside the pressurized environment (e.g., not at the interface of the pressurized container). In one example, there may be a volume interface to allow a conduit to be connected to another conduit to allow contents to pass through the pressurized container. In another example, there may be a volume interface to allow a conduit to pass through the pressurized container.

In some embodiments, the compressible containers 640-1 and 640-2 contain liquids or beverages such as wine, concentrated caffeinated beverages such as soda or coffee, hard lemonade, soft serve, and/or the like. In various embodiments, the compressible liquid volume 640-1 contains carbonated liquid. In some embodiments, one or more of the compressible liquid volumes 640 may be filled with beverage or food items such as custard, yogurt, ice cream, soft serve, and the like. In some embodiments, the compressible liquid volume 640-2 contains chocolate flavoring, sugar syrup, fruit syrups, or coffee syrup for various types of beverages or food items. In one example, the compressible liquid volumes 640-2 may contain syrups or sauces for soft serve or other foods. In some embodiments, each of the compressible liquid volumes 640-1, 640-2, and 640-3 includes their respective solenoid 660 and 662. In various embodiments, one or more of the compressible liquid volumes 640-1, 640-2, and 640-3 includes a sealed outlet port which couples to their respective solenoid 660 and 662, thereby eliminating the need for one or more of the conduits 670, 672, and 674.

In some embodiments, rather than utilizing the same valves that enable dispensing of the fluids from within the compressible container(s), the compressible container may include a second locking mechanism for coupling to a refilling conduit. In this example, a compressible container may include two locking mechanisms: one for locking with a conduit for dispensing fluids and another for locking with a refilling conduit. In various embodiments, the compressible container may include only one locking mechanism, and the two conduits (e.g., one for dispensing and one for refilling) may be joined by a valve or other mechanism such that a conduit from the compressible container may be locked to the compressible container as well as coupled to a conduit for refilling.

The refilling conduit may be coupled to a vessel or container outside the pressurized environment. In some embodiments, the refilling conduit may pass through an interface (e.g., volume interface or valve 662) of the pressurized container. The interface may provide a path for the refilling conduit to pass from the inside of the pressurized environment to the outside of the pressurized environment. In some embodiments, the refilling conduit may be coupled to the interface, and a second refilling conduit may be coupled to the interface and the refilling container. In some embodiments, either refilling conduit may be coupled to a pump or the refilling container. The refilling container may contain the beverage, flavoring, beverage component, or food-like substance that is to refill the compressible container. A pump may pump the beverage, flavoring, beverage component, or food-like substance from the refilling container to the compressible container over the refilling conduit(s). In this way, the compressible container may not need to be removed from the pressurized container in order to be refilled.

In various embodiments, there may be any number of refilling conduits, each one coupled to a different valve (e.g., valves 660 and 662). Each refilling conduit may be labeled such that they indicate a direction, compressible container, or contents of the compressible container. These refilling conduits may be bound or organized such that it is efficient to identify a particular refilling conduit coupled to a depleted compressible container, couple the refilling conduit to a pump or refilling container, and activate the process of refilling.

In some embodiments, a pump is not used to refill the compressible container. In some embodiments, the contents of the refilling container (e.g., refilling container 640-3) is under pressure, and the contents of the refilling container 646 is pushed over the refilling conduit to the compressible container 640-3 to be refilled when a valve at refilling container 646 is released (and the valve 662 is opened).

It will be appreciated that the beverage management system may monitor if a compressible container is depleted. The monitoring may be done in any number of ways. In one example, the beverage management system may track the volume dispensed from a compressible container (e.g., through the number of servings and serving sizes dispensed and recipe profiles). In another example, the dispensing system 600 may include a sensor for tracking the flow and/or amount of beverage, component, flavoring, or food-like substance dispensed. Based on the known volume contained by the compressible container, the dispensing system 600 may provide a notification (e.g., alarm, email, message on a screen, sound, text message, or alert) to indicate if one or more compressible containers are low (e.g., by comparing the volume dispensed to a known threshold). In some embodiments, the beverage management system may provide a notification to a remote digital device (e.g., the smartphone with an application that is used for indicating the desired beverage). In some embodiments, the dispensing system 600 may weigh one or more compressible containers and provide the notification when one or more compressible containers are light. Once refilled, a user may indicate that a compressible container is refilled, or the beverage management system may sense when refilled (e.g., by weight, the valve used for refilling, sensor, and/or the like).

A pump may pump the beverage, flavoring, beverage component, or food-like substance from the refilling container to the compressible container over the refilling conduit(s). In this way, the compressible container may not need to be removed from the pressurized container in order to be refilled. The pump may be manual or electronic.

Each of the valves 660 and 662 may be coupled to the compressible containers 640-1, 640-2, and 640-3, respectively. In some embodiments, the valves 660 and 662 are controllable A/B Open/Close solenoids. In various embodiments, one or more of the valves 660 and 662 may be a controllable three-way solenoid that allows liquid from one compressible container to be transferred to another compressible container. For example, compressible container 640-1 may contain any liquid, food, mixer, carbonated water, or the like and in response to a corresponding control signal from the control system 620, the directionality of flow of the solenoid 660 may be adjusted to allow a portion of liquid, food, mixer, carbonated water, or the like from the compressible container 640-1 to be transferred to the compressible container 640-2.

The control signal from the control system 620 may control the directionality of the flow of the conduits coupled to the three-way solenoid. For example, the solenoid may allow liquid to be transported from the compressible container 640-2 through the solenoid 660 to a dispensing conduit 680 and to the dispenser pour unit 690. In some embodiments, the control signal from the control system 620, is capable of controlling the solenoid to allow liquid to be transported from the compressible container 640-1 to the compressible container 640-2. By transferring the beverage or food item from one compressible container to another, the contents of the compressible container may be refilled or replenished without having to access the pressurized canister/cartridge 610 and replacing one compressible container with another.

A liquid volume 640-1 may be coupled to the compressible container 640-2 via transport conduits 670 and 672 and a three-way solenoid such as solenoid 660. The liquid volume 640-1 may be used to refill or replenish the contents of the compressible container 640-2 without having to access the pressurized canister/cartridge 610 and replacing one compressible container with another. In some embodiments, the liquid volume 640-1 may contain the same type of liquid as the compressible container 640-2.

In one embodiment, the liquid volume 640-3 may contain different beverage or food items. For example, if the compressible container 640-3 contains soft vanilla serve, and the liquid volume 646 contains a chocolate-flavored syrup, some of the contents of the liquid volume 646 may be transferred to the compressible container 640-3 to change the contents of compressible container 640-3 from soft vanilla serve to soft chocolate serve. This allows an operator of the dispensing system 600 to change the contents of the compressible containers without having to access the pressurized canister/cartridge 610, which will disrupt the operations of the dispensing system 600 since the system needs to be de-pressurized before the operator may have access to the compressible containers inside the pressurized canister/cartridge 610.

One or more of the pressurized canister/cartridge 610 may be automated at a predetermined desired "automation level," ranging from a "lowest automation level" to a "highest automation level" (and which may be configured at any desired automation level therebetween):

1) at the lowest "automation" level, the multiple pressurized canister/cartridge 610 may be controlled from the dispenser pour units (to initiate pours) and may provide minimum needed feedback such as alarms (e.g., wine running low or empty, pressurization problem(s), temperature variance in the system beverage storage component being outside safe range), without the need for the use of a centralized control, system; and
2) at the highest "automation" level, the multiple pressurized canister/cartridge 610 may be controlled from a centralized control system (such as a local control system) that may optionally utilize local controls at the dispenser pour units to initiate pours and/or utilize local control systems) that can, in addition to providing a centralized alarm/system information dashboard, also manage and automatically address various system issues (such as monitoring pour volumes and making automatic adjustments of pressure parameters in individual pressurized canister/cartridge to maintain predetermined "perfect metered pour" volumes, control temperature, automatically initiate and conduct cleaning processes (for example if dispensing system cleaning/sanitizing components and features are utilized), etc., in addition to performing various monitoring, reporting, and additional data processing functions (from monitoring beverage sales, inventory management, tracking beverage condition, and performing auto-reorders, to security/personnel management features tracking each pour by a person who initiated it, and collecting and utilizing related data.

Figure 7A:
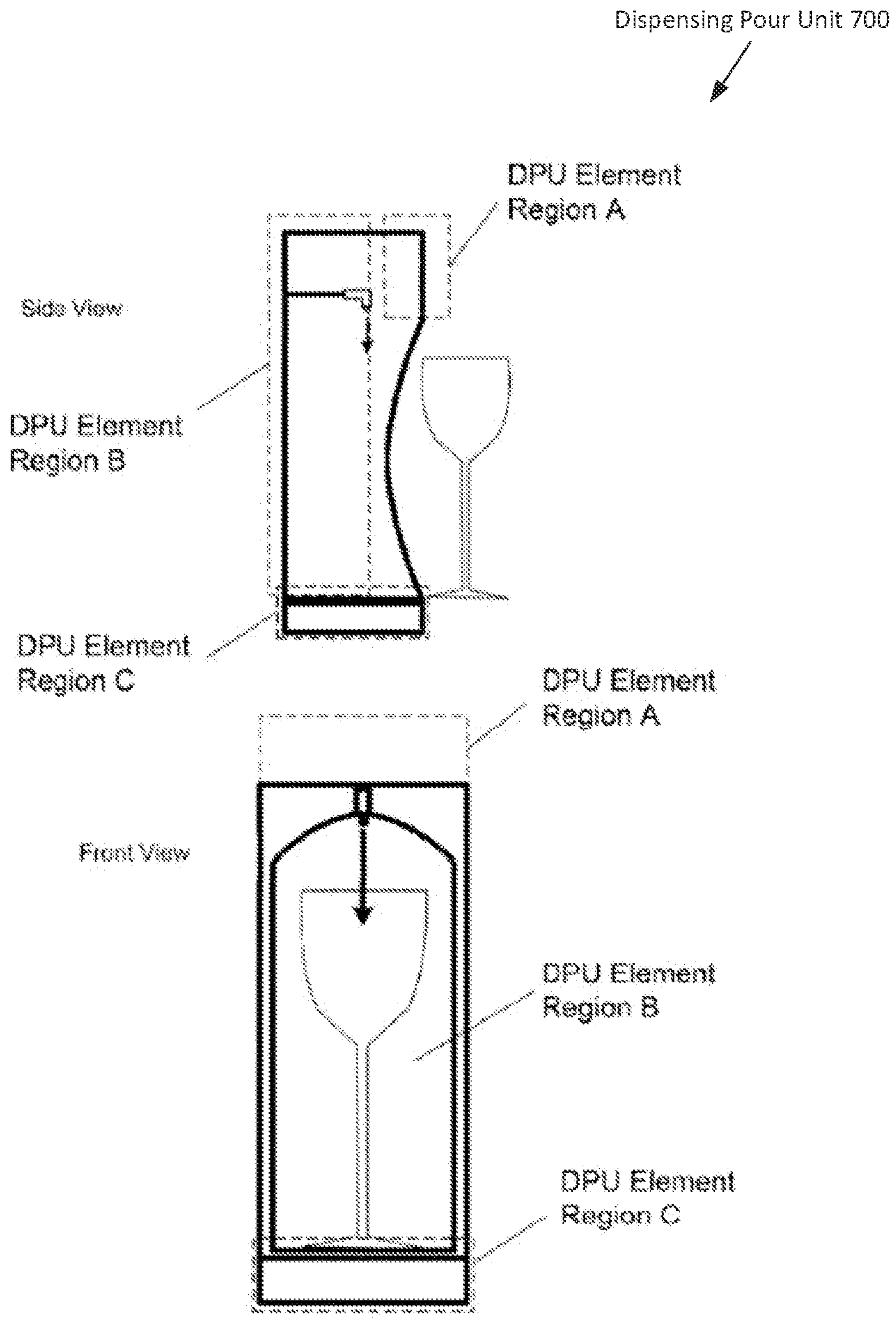
FIG. 7A is an illustrative diagram of a dispensing interface according to some embodiments.
Figure 7B:
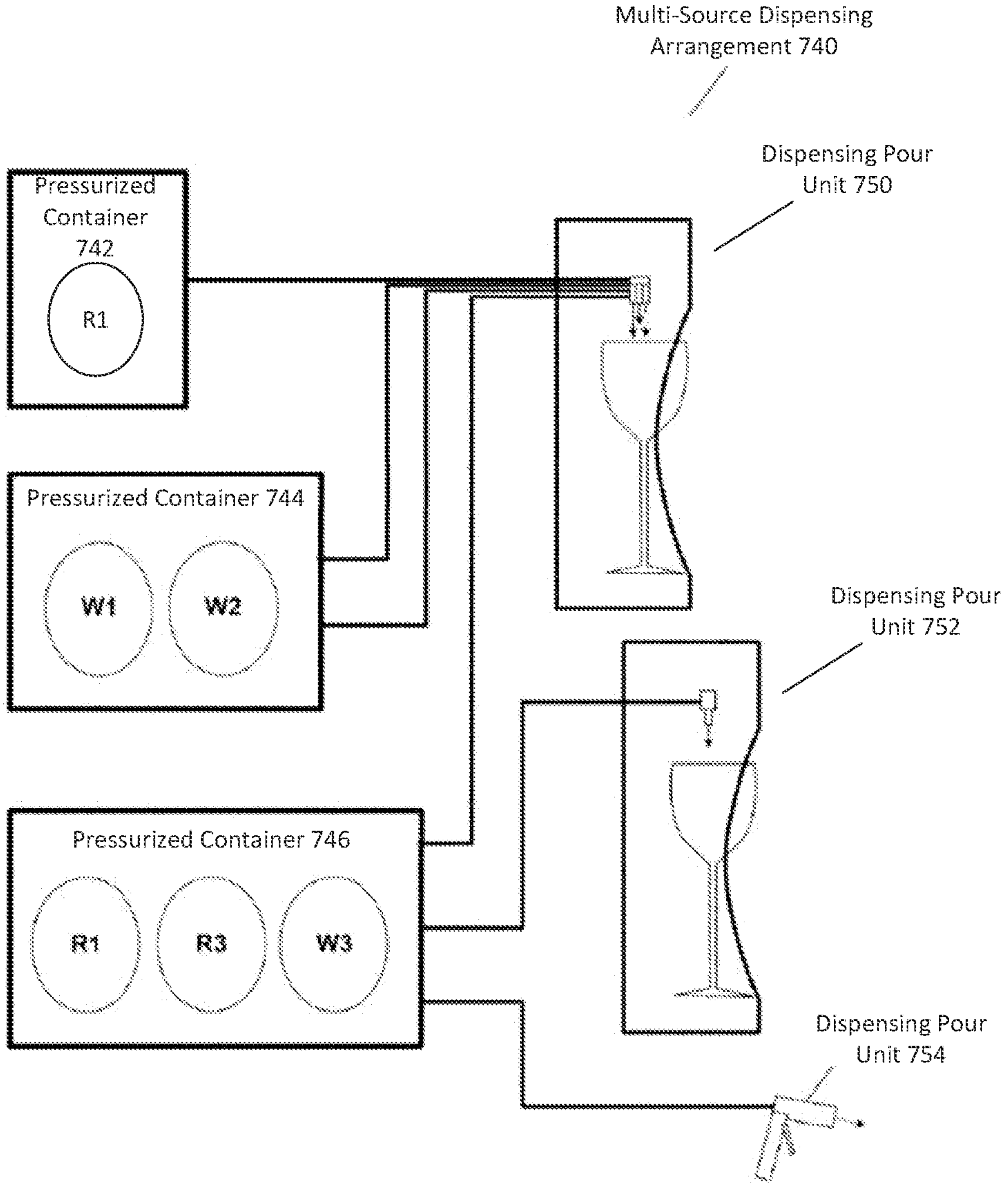
FIG. 7B is an illustrative diagram of a dispensing interface that includes multiple dispenser pour unit components according to some embodiments.

FIG. 7A is an illustrative diagram of a dispensing pour unit 700 according to some embodiments. The dispensing pour unit 700 may be an embodiment of the dispensing interface 14*a* of dispensing system 100 in FIG. 1. The dispensing pour unit 700 may be readily configured to include a variety of advantageous features and functions that may be located, disposed of, and/or otherwise positioned, in whole or in part in one of several dispenser pour unit ("DPU") regions A to C (as shown in FIG. 7A), and which may include, but which are not limited to, at one or more of the following:

a. a flow sensor (e.g., a flow meter), or equivalent means of sensing the quantity of liquid that has been dispensed in each metered pour. In some embodiments, the flow sensor may include an image capture device. Digital images or video captured by the image capture device may be sent or stored for viewing by one or more users of the dispensing system 100 for quality control or security purposes. For example, a shift manager or owner of a restaurant may monitor a beverage dispensed or being dispensed by the dispensing interface of the dispensing system 100 to determine if the quality of the beverage is up to the standard of the restaurant. Furthermore, the shift manager or owner may determine if the quantity of wine dispensed by the dispensing system 100 when a member of the wait staff interacts with the graphical user interface of the local dispensing control system 48*a* and requests a glass of wine corresponds to the quantity set by the owner of the restaurant. If there is a discrepancy between the two, the dispensing system 100 may require calibration.
b. Pour/Dispense Activation (i.e., the manner in which the dispensing of the wine is initiated) may include one or more of the following:
   1. Manual Control: manual control may be activated by the user after a glass is positioned within the dispensing pour unit 700 to cause the pressurized container 22*a* (that is coupled to the dispenser pour unit) to rapidly dispense a predefined quantity of wine into the glass, which may include one or more of the following:
      i. push button, switch, or equivalent manually operated control element.
      ii. voice-based interface (which may provide additional features such as the ability to select a specific wine to be poured in dispenser pour unit embodiments in which plural dispensing conduits are connected to a single dispenser pour unit).
      iii. remote control (having one, or both of the above types of controls activated implemented as an electromechanical device, or as a software application (for example, as an "App" in a mobile communication device).
   2. Automatic Control: automatic control may include automatic actuation when the dispenser pour unit detects that a correct wine glass is properly placed and aligned in the dispenser bay (for example, before a glass of Pinot Noir is poured, the dispenser pour unit may need to detect that the proper Pinot Noir wine glass is situated in the dispenser bay), enabling immediate dispensing of a predefined "pour amount" of the wine into the glass. The manner in which glass placement and positioning occur may be selected as a matter of design choice and may comprise:
      i. Mechanical sensor-pressure sensor, sensing switch (e.g., roller ball switch, motion trip switch, etc.), or ii. Non-mechanical sensor-IR, ultrasonic, light-based, motion sensor, radio-frequency identification (RFID), near-field communication (NFC) etc., c. Available Pour Options identification-enabling identification for each dispenser pour unit, the corresponding "available to pour" wines and, when applicable, available options (e.g., blended pours, carbonation, or the like), pour size control (e.g., for optionally dispensing different volume pours, such as smaller volume "tasting" pours), and may comprise, at each dispenser pour unit, an electronic display (optionally supplied with a graphical user interface), physical labels (or replaceable printed info card(s)), labeled buttons or other physical controls, or if the dispenser pour unit is operable to communicate therewith, via an App installed on a mobile device, etc.

d. Glass Positioning/Alignment—may comprise structural and/or mechanical guides in the bottom portion of the dispenser bay to physically assist in guiding the glass into a proper position within the dispenser bay to receive wine dispensed and/or may include visual cues to assist in glass positioning, such as illustrative and/or color indicators. Optionally, sensor and/or electronic feedback features may also be included. These feedback features may include an indicator light and/or an audio tone that indicates when the glass is properly positioned. Additionally, a splash protection element (such as a flexible and optionally retractable flange or cover) may be provided to limit or substantially eliminate the possibility of the dispensing process causing the dispensed beverage to splash out of the glass, e. Replaceable dispenser pour unit nozzles that may be utilized to enhance the wine being dispensed (such as an aeration nozzle), f. An optional light source operable to illuminate the target container H into which the liquid is being dispensed during the dispensing process, such that the cessation of the illumination serves as an indicator that the dispensation has been completed (the completion of the dispensing process may also/alternately be indicated by other means, such as by an audio signal).

g. Authentication of the user identity-biometrically (such as by a fingerprint sensor integrated into the pour control, or by facial or voice recognition, and/or by other ID verification means—e.g., an RFID card, or the like), where the user may be an authorized establishment employee, or a customer pre-enrolled with an account in the biometric system that is permitted to self-dispense from a biometric verification enabled dispenser pour unit.

Figure 7C:
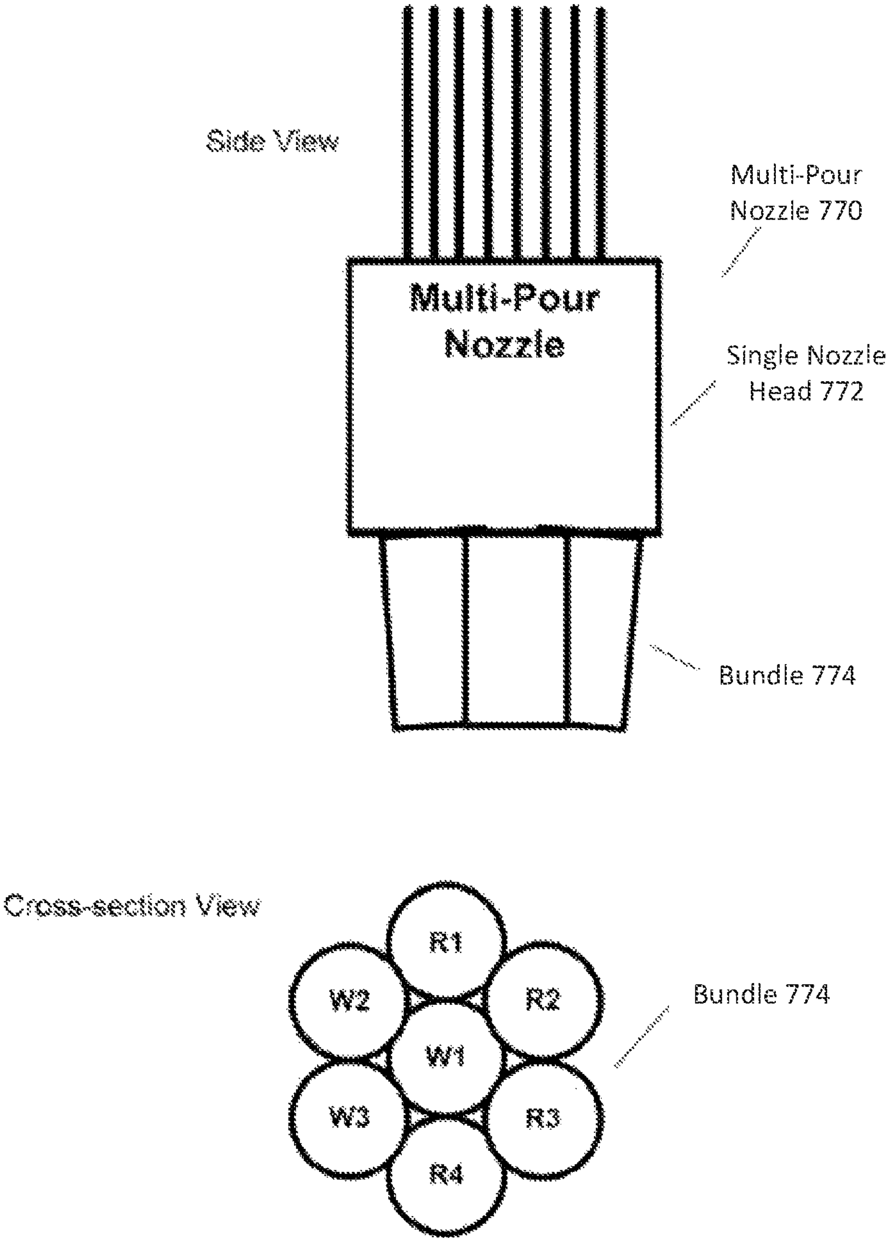
FIG. 7C is an illustrative diagram of a dispensing interface that includes a dispenser pour unit multi-pour nozzle element according to some embodiments.

The dispensing pour unit 700 may include a multi-pour nozzle, such as multi-pour nozzle 770 shown in FIG. 7C. The multi-pour nozzle 770 may include a single nozzle "head" 772 and/or include multiple nozzle elements 774 to enable the dispensing pour unit 700 to dispense different beverages. For example, multiple wines selected from four different red wines R1 to R4, and three different white wines W1 to W3 may be dispensed from the nozzles. In some embodiments, each beverage source may be connected to a corresponding nozzle element in the bundle 774, and to a corresponding PSP system source, which, may comprise one of:

1. A multi-beverage single pressurized container 22*a* (s) (e.g., different individual compressible liquid volumes stored in the same pressurized canister), such as pressurized containers 744 and 746 shown in a multi-source dispensing arrangement of FIG. 7B, each of the pressurized containers 744 and 746 may be coupled to a dispensing pour unit 750 and 752, respectively,
2. Multiple pressurized containers (e.g., different individual compressible liquid volumes each stored in a different pressurized container), such as a pressurized container 742 (and similar additional pressurized containers (not shown) of FIG. 7B, and
3. Any combination of single pressurized container(s), each with a single compressible liquid volume, and pressurized containers each with multiple compressible liquid volumes, such as the pressurized containers systems 742, 744, and 746 of the multi-source dispensing arrangement 740 of FIG. 7B.

A multi-pour nozzle 770 may comprise any number of nozzle elements ranging from 2 to 9 (or more), determined as a matter of design choice, without departing from the spirit of the invention.

A dispenser pour unit that comprises a multi-pour nozzle (such as the multi-pour nozzle 770) may be equipped with "Blended Pour" functionality, enabling a wide range of beverages such as wines to be blended during the dispensing process, each blended pour being configured in accordance with at least the following parameters (collectively comprising a corresponding "Blended Pour Profile"): (1) selection of number and types of wine to be blended, and (2) selection of pour volume of each wine to be blended, 1. The blended pour functionality is preferably implemented in dispenser pour units equipped with a multi-pour nozzle (see above). During blended pour operation, multiple selected nozzle elements are activated substantially simultaneously (preferably to dispense each wine to be blended in accordance with a selected predetermined Blended Pour Profile) to enable beverage blends (such as wine varietal blends) to be instantaneously produced in the glass positioned in the dispenser bay of the dispenser pour unit.
2. Blended Pour Profiles can be changed periodically (e.g., nightly) by the operating entertainment venue to reflect beverage menu items and/or specials, Blended Pour Profiles may also be custom configured by an authorized operator of a dispenser pour unit on a case by case basis, and/or by an end-user (e.g., a customer), for example through a control system such as the local dispensing control system 48*a* of FIG. 1 supplied by the operating establishment, or remote controller components such as a software application, or "app" installed on a mobile computing device (that may connect to the control), which may also provide Blended Pour Profile suggestions based on framed Bordeaux or other appellations, on various vintages and specific wines.

Figure 8A:
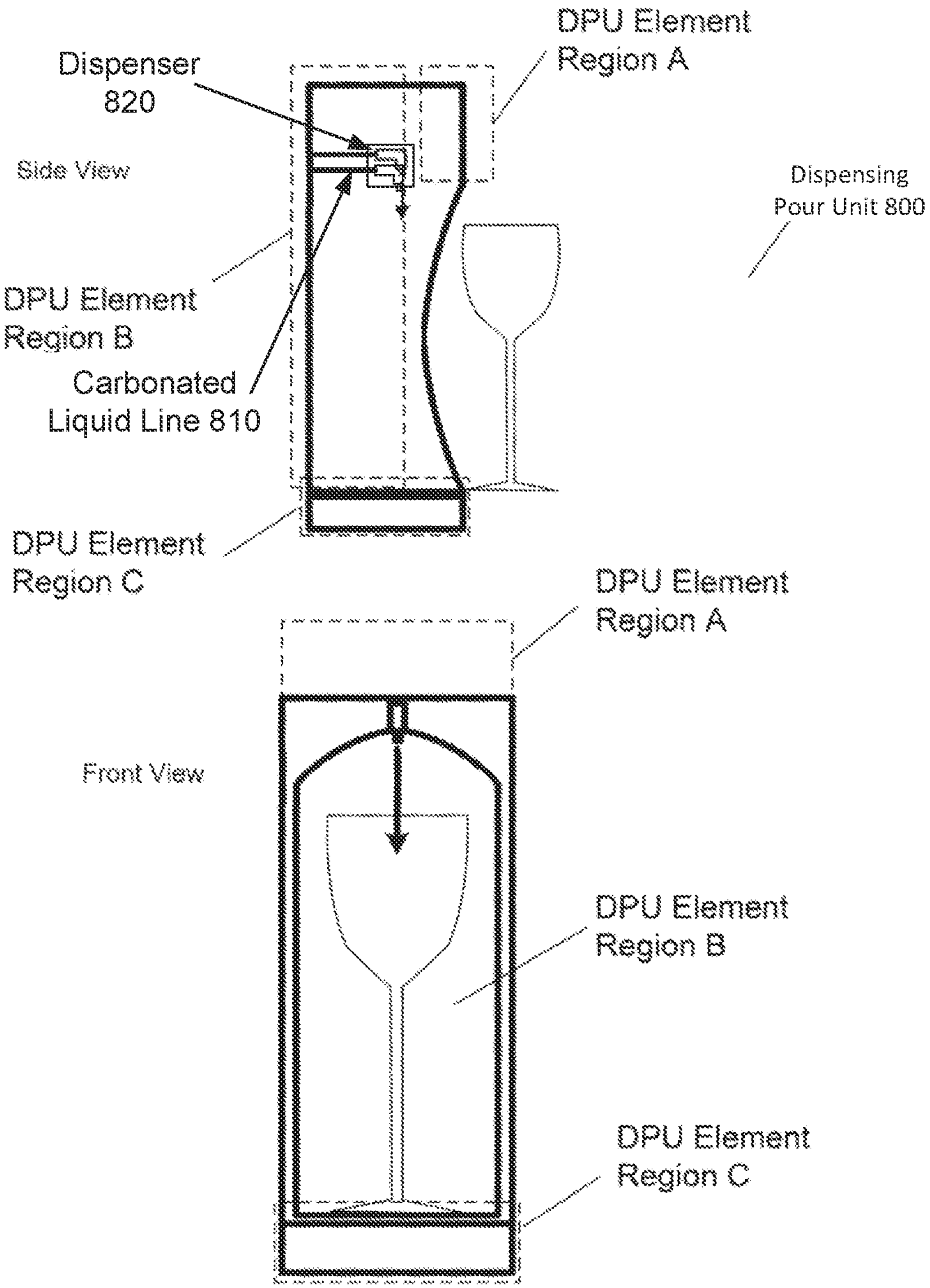
FIG. 8A is an illustrative diagram of a dispensing interface that includes a dispenser pour unit component that includes a carbonated liquid line according to some embodiments.

FIG. 8A is an illustrative diagram of a dispensing interface that includes a dispenser pour unit 800 component that includes a carbonated liquid line according to some embodiments.

Referring now to FIGS. 8A-7C, each of the various dispenser pour units that may be, in various embodiments, utilized in connection with the dispensing system 100 of FIG. 1, may comprise any apparatus, device, or system suitable for dispensing liquids such as beverages (e.g., wine) or other fluids used in different venues or companies (e.g., fertilizer, anti-weed solutions, detergents, anti-bug solutions, or the like).

In one example where the system dispenses beverages and/or foods, the system may dispense liquids via rapid metered pours into an appropriate container (e.g., a wine glass). For example, a dispenser pour unit may be a simple spout, a gun-type hand-operable manual dispenser (such as a dispenser pour unit 754 shown in FIG. 7B), or it may comprise a vertically elongated housing comprising an opening sized and configured to receive a glass therein, such that the ovine glass can be positioned beneath a pour element to ensure that the dispensed liquid enters the glass during the dispensing process (such as the dispensing pour unit 700 of FIG. 7A).

Referring now to FIG. 8A, an example embodiment of a dispenser pour component is shown, in multiple views, as a dispenser pour unit 800. The dispenser pour unit 800 can be readily configured to comprise a variety of advantageous features and functions that may be located, disposed, and/or otherwise positioned, in whole or in part in one of several dispenser pour unit ("DPU") regions A to C (as shown, by way of example, in FIG. 8A).

Figure 8B:
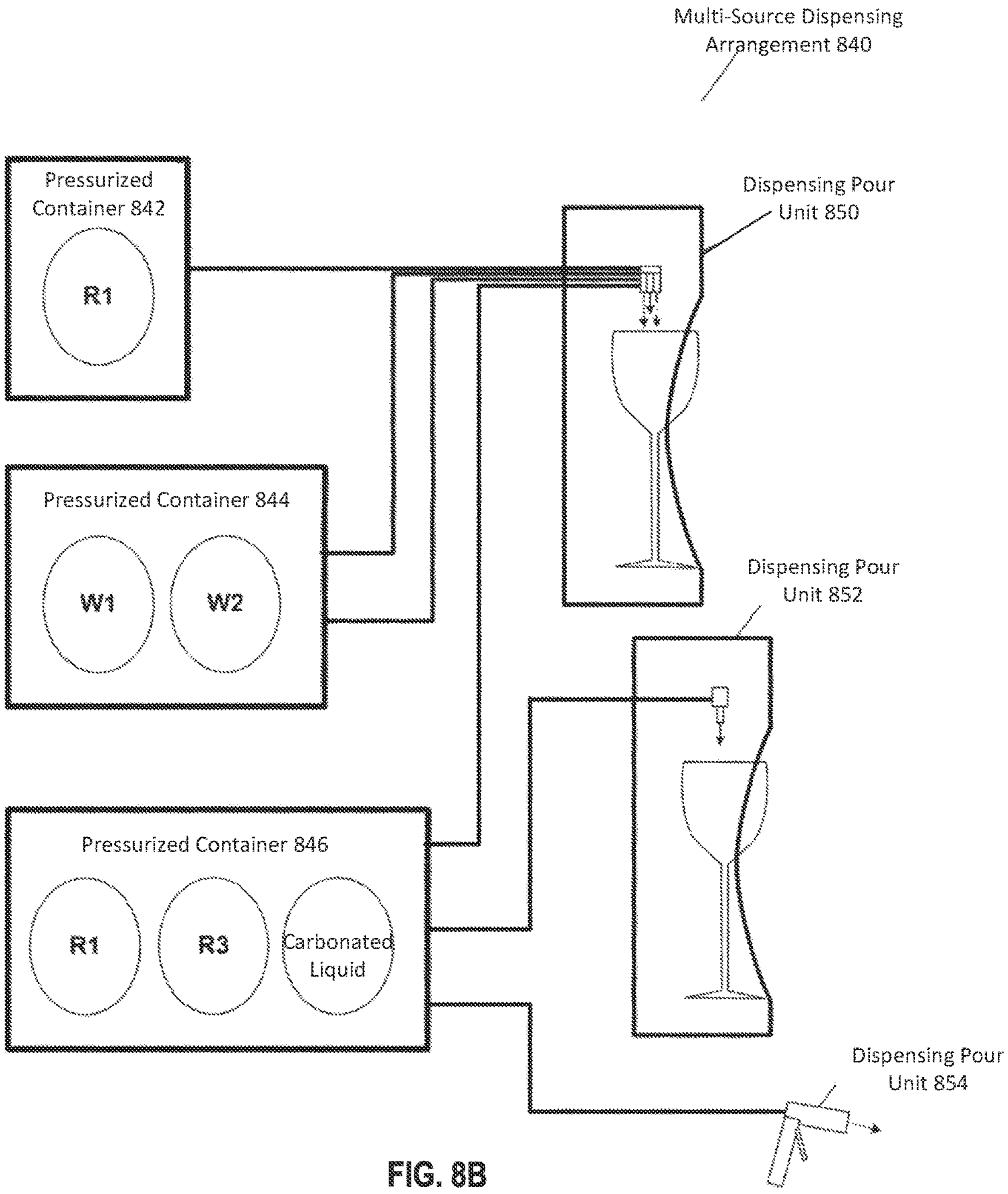
FIG. 8B is an illustrative diagram of a dispensing interface that includes multiple dispenser pour unit components and multiple beverage sources that includes a carbonated liquid line according to some embodiments.
Figure 8C:
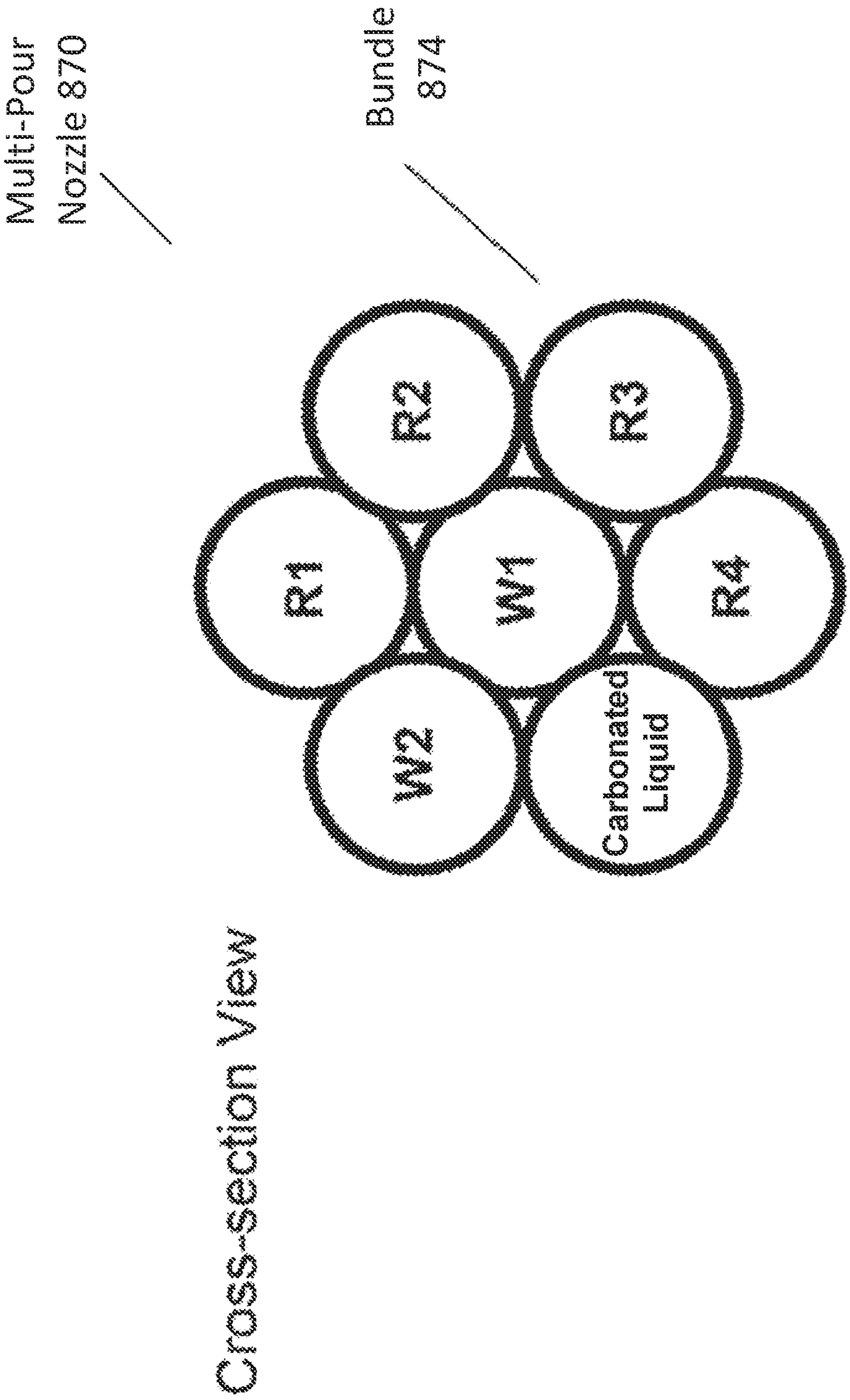
FIG. 8C is an illustrative diagram of a cross-section view of a dispensing interface that includes a multi-pour nozzle element according to some embodiments.

One difference between FIG. 8A and FIG. 7A is that FIG. 8A depicts a carbonated liquid line 810 that runs along one or more liquid conduits to the dispenser or nozzle 820 (e.g., spigot and/or multi-spigot nozzle depicted in FIGS. 7C and 8C. The carbonated liquid line 810 may dispense carbonated water or any carbonated liquid. The carbonated water or any carbonated liquid may be dispensed by a multi-spigot nozzle, by a nozzle that is separate from another nozzle that dispenses a different beverage (e.g., to enable mixing as the two liquids pour from the nozzles into a glass or other container) or the like. It will be appreciated that there may be any number of nozzles, each dispensing any number of liquids, and one capable of dispensing and/or dispensing the carbonated liquid. Each nozzle may include its own liquid conduit or tube that receives at least one beverage from the pressurized system discussed herein. In some embodiments, the carbonated liquid line 810 is coupled to a container containing carbonated water or other carbonated liquid that is inside the pressured system In some embodiments, the carbonated liquid line 810 is coupled to a container containing carbonated water or other carbonated liquid that is outside the pressured system (e.g., a liquid dispensed by at least one other nozzle may be stored in the pressured system, and the carbonated liquid line 810 may receive carbonated liquid from a container outside the pressured system).

In some embodiments, the carbonated liquid line does not reach the dispenser or multi-spigot nozzle but rather adds carbonated liquid to within a liquid transport conduit or other apparatus to enable mixing or combinations of liquid with the carbonated water prior to being dispensed by the nozzle(s).

In various embodiments, the carbonation module may dispense gas for carbonating a liquid stored in the pressure system (e.g., for creating carbonated beverages) as described herein. Additionally, the carbonated liquid line 810 may allow for a combination of a carbonated liquid with another liquid (e.g., for hard lemonade, soda, and/or the like).

Similar to the system of FIG. 7A, the system of FIG. 8A may include, but are not limited to one or more of a flow sensor and/or a pour/dispense activator. The flow sensor (e.g., a flow meter), or equivalent may include means of sensing the quantity of liquid that has been dispensed in each metered pour. The pour/dispense activator may include the manner in which the dispensing of the liquid(s) are initiated) as discussed herein. The Pour/Dispense Activator may include manual or automatic control as discussed herein. The system may also include available pour options identification (as discussed herein), a glass positioning/alignment system (as discussed herein), replaceable dispenser pour unit nozzles that may be utilized to enhance the beverage being dispensed (such as an aeration nozzle that may assist wine) (as discussed herein), an optional light source operable to illuminate the target container into which the liquid is being dispensed (as discussed herein), user identity authentication (as discussed herein), and/or a multi-pour nozzle, such as multi-pour nozzle 870 shown in FIG. 8C.

The multi-pour nozzle 870 may include a single nozzle "head" 872 comprising a bundle of multiple nozzle elements 874 disposed therein, to enable the dispenser pour unit 800 to dispense different beverages (for example, multiple wines selected from four different red wines R1 to R4, two different white wines W1 to W2, and carbonated water) from multiple corresponding beverage sources. Each beverage source, including or not including the carbonated water source (or carbonated liquid source) may include a dispenser conduit, connected to a corresponding nozzle element in the bundle 874, and to a corresponding PSP system source, which may comprise one or more of:

1. A multi-beverage single pressurized container **22*a* (s) (e.g., different individual compressible liquid volumes stored in the same pressurized canister), such as pressurized containers 844 and 846 shown in a multi-source dispensing arrangement of FIG. 8B, each of the pressurized containers 844 and 846 may be coupled to a dispensing pour unit 850 and 852**, respectively,
2. Multiple pressurized containers (e.g., different individual compressible liquid volumes each stored in a different pressurized container), such as a pressurized container 842 (and similar additional pressurized containers (not shown) of FIG. 8B, and
3. Any combination of single pressurized container(s), each with a single compressible liquid volume, and pressurized containers each with multiple compressible liquid volumes, such as the pressurized containers systems 842, 844, and 846 of the multi-source dispensing arrangement 840 of FIG. 8B.

FIG. 8B is another illustrative diagram of an exemplary implementation of an arrangement of multiple dispenser pour unit components and multiple beverage sources that includes a carbonated liquid line in some embodiments. The example of FIG. 8B may be similar to that of FIG. 7B. The example of FIG. 8B may, in some embodiments, be readily utilized in the system of FIG. 1.

FIG. 8C is another illustrative diagram of an exemplary embodiment of a dispenser pour unit multi-pour nozzle element that may be readily utilized as a subcomponent in the various dispenser pour unit embodiments of FIGS. 1-4, 6, 7A, 7B, and 7C.

A multi-pour nozzle 870 as depicted in FIG. 8C may comprise any number of nozzle elements ranging from 2 to 9 (or more), determined as a matter of design choice.

Figure 9:
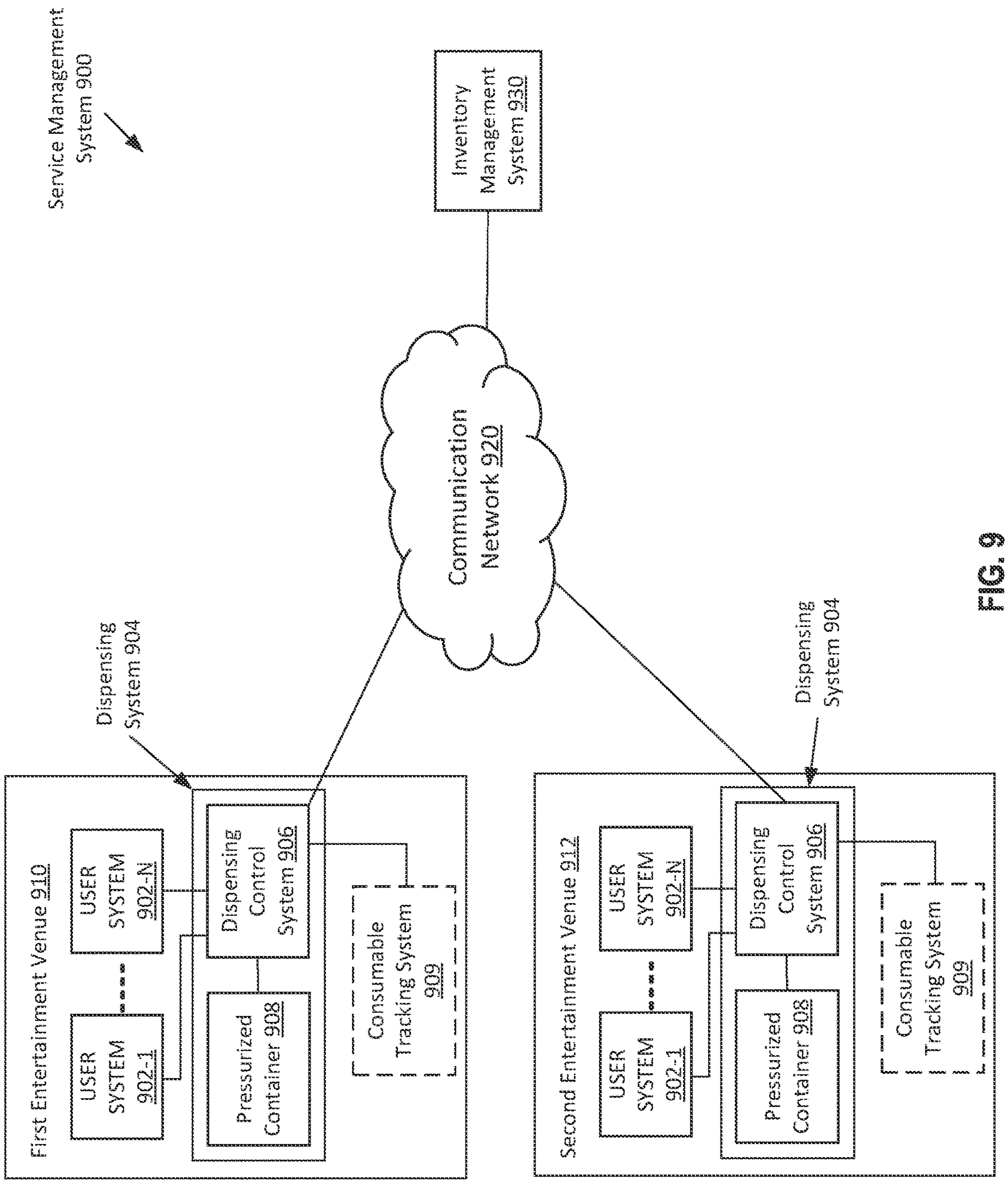
FIG. 9 is an illustrative diagram of an example environment capable of providing service and inventory to dispensing systems and support for establishments utilizing the dispensing systems according to some embodiments.

A dispenser pour unit that comprises a multi-pour nozzle (such as the multi-pour nozzle 870) may be equipped with "Blended Pour" functionality as discussed herein FIG. 9 is an illustrative diagram of an example environment capable of providing service and inventory to dispensing control systems and support for establishments utilizing the dispensing control systems according to some embodiments. The example environment includes a service management system 900. The service management system 900 includes a first entertainment venue 910, a second entertainment venue 912, a communication network 920, and an inventory management system 930.

Each of the first entertainment venue 910 and second entertainment venue 912 may be a restaurant, a bar, or some other entertainment venue which may utilize multiple user systems 902-1 through 902-N (individually, collectively user system 902), a dispensing system 904, and an optional consumable tracking system 909.

In some embodiments, user system 902 may be configured to facilitate communication between users and other associated systems. In some embodiments, user system 902 may be utilized by a user of the first entertainment venue 910. In various embodiments, users of the first entertainment venue 910 may include employees of the first entertainment venue 910, such as bartenders or waiters/waitresses. In some embodiments, the users of the user system 902-1 may be patrons or customers of the first entertainment venue 910. In some embodiments, the user system 902-1 may be or include one or more mobile devices (e.g., smartphones, cell phones, smartwatches, desktop computer, tablet computer, or the like), desktop computers, laptop computers, and/or the like. In one embodiment, a software application installed on the mobile devices, the software application may include a graphical user interface that provides remote access of the dispensing system 904 to the user system 902-1. An example of user system 902 may be seen in FIG. 13.

Embodiments of the dispensing system 904 may include the dispensing system of FIG. 1-4 or 6. The dispensing system 904 includes a dispensing control system 906 and a pressurized container 908.

The dispensing system 904 may include components such as pressurized canister/cartridges. Compressible liquid volumes may be stored within the pressurized canister/cartridges to provide a pressurized environment to dispense a portion of stored liquid based on a change in the pressure applied to the pressurized canister/cartridges.

The dispensing control system 906 may receive control signals from a local control system which may be part of the dispensing system 904 and/or a remote controller component which includes a software application that sends control signals to remotely control various aspects of the dispensing system 904 such as the pressurized canister/cartridge, temperature, dispensing profiles, user profiles, solenoid valves, and dispensing interface.

In some embodiments, the optional consumable tracking system 909 is in communication with the 904 to track the usage of beverages or food-like substances dispensed by the dispensing system 904. The optional consumable tracking system 909 may receive from the dispensing control system 906 properties of each of the compressible liquid volumes stored within the pressurized container 908 of the dispensing system 904. These properties may include the type of beverage, food, mixer, and/or liquid (red wine, white wine, coffee, soft serve, etc.), a viscosity of the beverage/liquid, the minimum required diameter of conduit required for the beverage/liquid, any temperature constraints (for example, soft serve may need to be kept below a certain temperature). The optional consumable tracking system 909 may utilize this information to determine the number of beverages or food-like substances which may be dispensed by a particular compressible liquid volume stored within the dispensing system 904 before the particular compressible liquid volume requires replacement. In some embodiments, the optional consumable tracking system 909 may send notification to the dispensing control system 906 and/or one or more users of the user system 902 when the fluid/liquid level of one or more compressible liquid volumes reaches a threshold. In various embodiments, the threshold may be based on the popularity of the beverage/liquid stored within the particular compressible liquid volume, the frequency with which the beverage/liquid is dispensed, and a cost of replacing the particular compressible liquid volume.

In some embodiments, the optional consumable tracking system 909 may record a time and date each of the multiple compressible liquid volumes were initially stored in the pressurized canister/cartridges. In various embodiments, the optional consumable tracking system 909 may record a time and date each of the multiple compressible liquid volumes is dispensed from the pressurized container 908. This information may be analyzed a pattern of usage of a particular beverage or a combination of beverages.

In some embodiments, the optional consumable tracking system 909 is in communication with a point of sale (POS). The POS may be a terminal where the first entertainment venue 910 may conduct the sale of the goods and services provided to patrons of the first entertainment venue 910. The POS may communicate with dispensing control system 906 of the dispensing system 904 to remotely control the dispensing of beverages or food-like substances from the pressurized container 908. In some embodiments, user system 902 is the POS. It may be appreciated that that consumption and inventory usage may be tracked (and insights derived for forecasting) using the dispensing system discussed herein (e.g., by tracking the ordered drinks or drinks served through the control system) and/or through communication with the POS to track orders that may be served outside the dispensing system described herein. As such, a holistic approach that tracks service and/or ordering from a variety of different mechanisms may enable tracking of consumption, tracking of ordering, tracking of inventory, automatic ordering of beverages, foods, liquids, mixers, and/or the like.

In some embodiments, the communication network 920 represents one or more computer networks (e.g., LANs, WANs, and/or the like). The communication network 920 may provide communication between elements of the first entertainment venue 910 and second entertainment venue 912, the user system 902, the dispensing control system 906 of the dispensing system 904, and optional consumable tracking system 909, and the inventory management system 930. In some embodiments, the communication network 920 may be wired and/or wireless. In various embodiments, the communication network 920 may comprise the Internet, one or more networks that may be public, private, IP-based, non-IP based, and so forth.

The inventory management system 930 may receive dispensing information from different entertainment venues such as the first entertainment venue 910 and the second entertainment venue 912. In some embodiments, the first entertainment venue 910 and the second entertainment venue 912 are physically situated in the same geographic region. The dispensing information received from the first entertainment venue 910 and the 912 may include the types of compressible liquid volumes used by each of the entertainment venues, the amount of time elapsed to dispense each compressible liquid volume, popular recipes used by one or more of the entertainment venues. The inventory management system 930 may use this information to determine community or regional trends and make recommendations to the different venues.

For example, the inventory management system 930 receives dispensing information from the first entertainment venue 910 and the second entertainment venue 912 and determined that in the last two weeks, there has been an increase in patrons of the first entertainment venue 910 and the second entertainment venue 912 ordering a particular drink. The particular drink may be dispensed a combination of two particular beverages from two different compressible liquid volumes of the dispensing system. The inventory management system 930 may utilize this information and recommend that a third entertainment venue (not shown) in the same geographic region as the first entertainment venue 910 and the second entertainment venue 912 of an increased interest in the community for the particular drink.

In some embodiments, the inventory management system 930 may analyze the dispensing information from the first entertainment venue 910 and the communication network 920 to obtain an understanding of a community. For example, the inventory management system 930 may determine that a particular beverage or a particular ingredient of a beverage or food item is popular with both the first entertainment venue 910 and the second entertainment venue 912. The inventory management system 930 may send a notification to the first entertainment venue 910 and the second entertainment venue 912 that both venues may pool their resources and make a single order of the particular beverage or the particular ingredient of a beverage or food item in order to obtain a better price from a wholesaler or distributor.

In some embodiments, the inventory management system 930 may receive information from third-party systems outside the dispensing control systems to determine or predict upcoming demands for particular beverages. For example, the inventory management system 930 may receive weather information from a third-party such as the National Weather Service and that a particular geographic region will experience a cold wave next week. The inventory management system 930 may utilize this information to predict or forecast an increase in the demand for hot beverages such as hot chocolate next week. The inventory management system 930 may send a notification to the first entertainment venue 910 and/or the second entertainment venue 912 of this forecasted increase in the demand. In another example, the inventory management system 930 may receive information regarding home and away games for a particular sports team. The inventory management system 930 may utilize this information to forecast demand for beverages associated with the particular sports team or beverages in general.

In various embodiments, the inventory management system 930 may receive information from social networking platforms such as FACEBOOK, TIKTOK, INSTAGRAM, TWITTER, and the like. For example, the inventory management system 930 may receive information regarding trending beverages that may be featured as a part of the latest trend and obtain a recipe for the trending beverage. In some embodiments, the inventory management system 930 may be configured to search social networking platforms to mine for beverage recipes or particular beverages or food-like substances referred to in trending social media posts. In one embodiment, the inventory management system 930 may determine the recipe and provide notification to one or more entertainment venues of the trending beverage.

In some embodiments, the inventory management system 930 may receive information from streaming services such as NETFLIX, HULU, DISNEY PLUS, YOUTUBE, and the like. For example, the inventory management system 930 may receive information on a particular beverage or food-like substance featured in a popular or trending streaming media. The inventory management system 930 may determine a recipe and compressible liquid volume required to make the recipe and provide notification to one or more entertainment venues of the trending beverage or food-like substance.

Figure 10A:
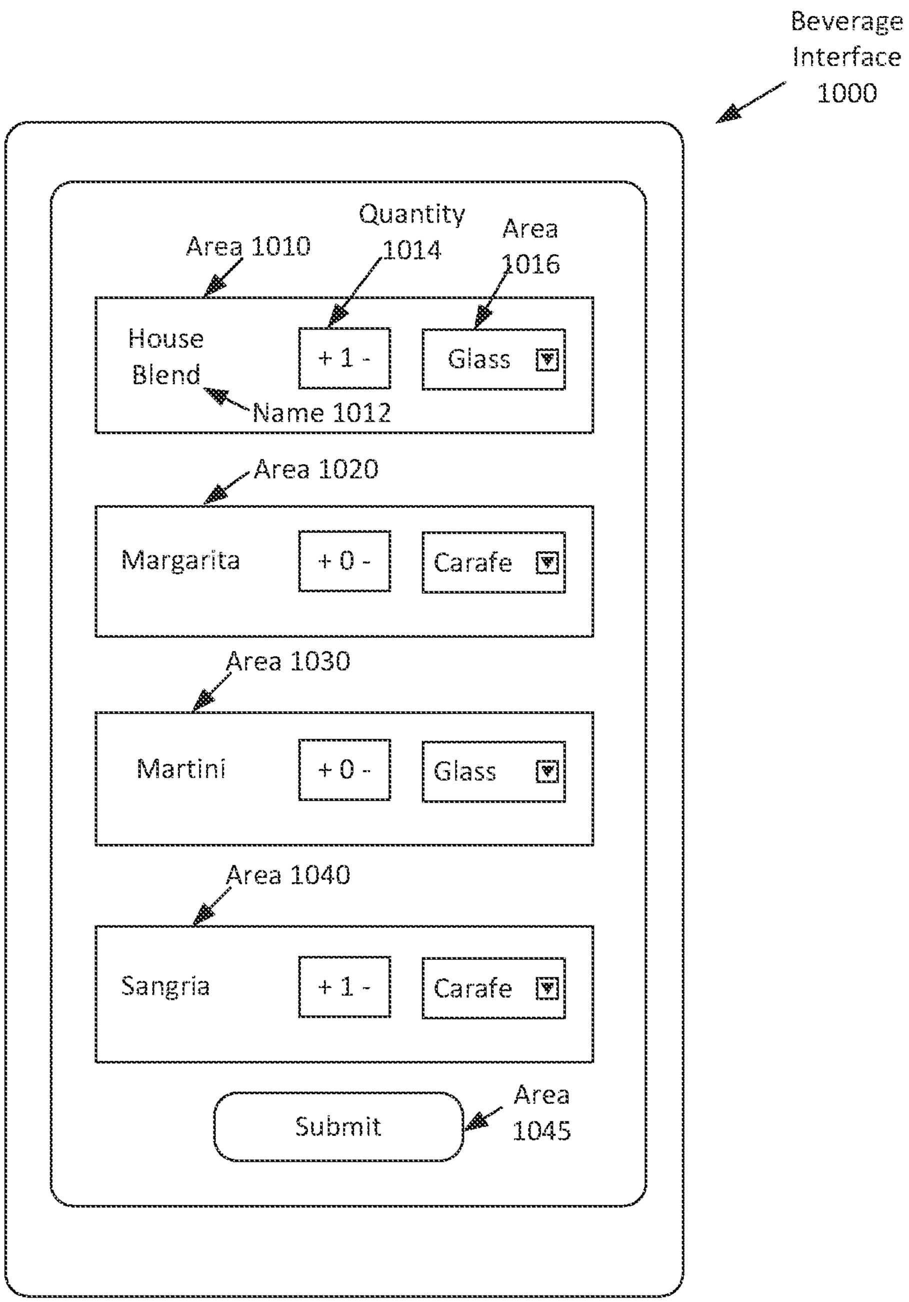
FIG. 10A is an example user interface for a dispensing system to dispense beverages based on blending profiles according to some embodiments.

FIG. 10A is an example user interface for a dispensing control system to dispense beverages based on blending profiles according to some embodiments. The example user interface includes a beverage interface 1000. The beverage interface 1000 may be provided to a graphics display of a user system, such as a mobile computing device. The user may interact with the beverage interface 1000 to execute program/control instructions. For example, an employee of an entertainment venue or a patron of the entertainment venue may interact with the beverage interface 1000 to remotely dispense a beverage from the dispensing system of the entertainment venue. In some embodiments, the beverage interface 1000 includes multiple areas, such as areas 1010, 1020, 1030, and 1040 which depict different types of beverages which may be chosen. Each of the areas includes multiple fields, such as the name of the beverage, which may be customized. The user may interact with areas 1014 and 1016 to provide an indication of a quantity and a type of container. For example, a user may interact with area 1014 to choose the number of beverages. The user may interact with area 1016 to choose the type of containers, such as a glass or a carafe. Once the user has made their selection, the user may interact with area 1045 of the beverage interface 1000 to submit the order. In some embodiments, the beverage interface 1000 is remotely operable to control multiple dispensing systems or pressurized containers of the entertainment venue. An interface similar to beverage interface 1000 may be utilized to remotely control a dispensing system to dispense food-like substances.

Figure 10B:
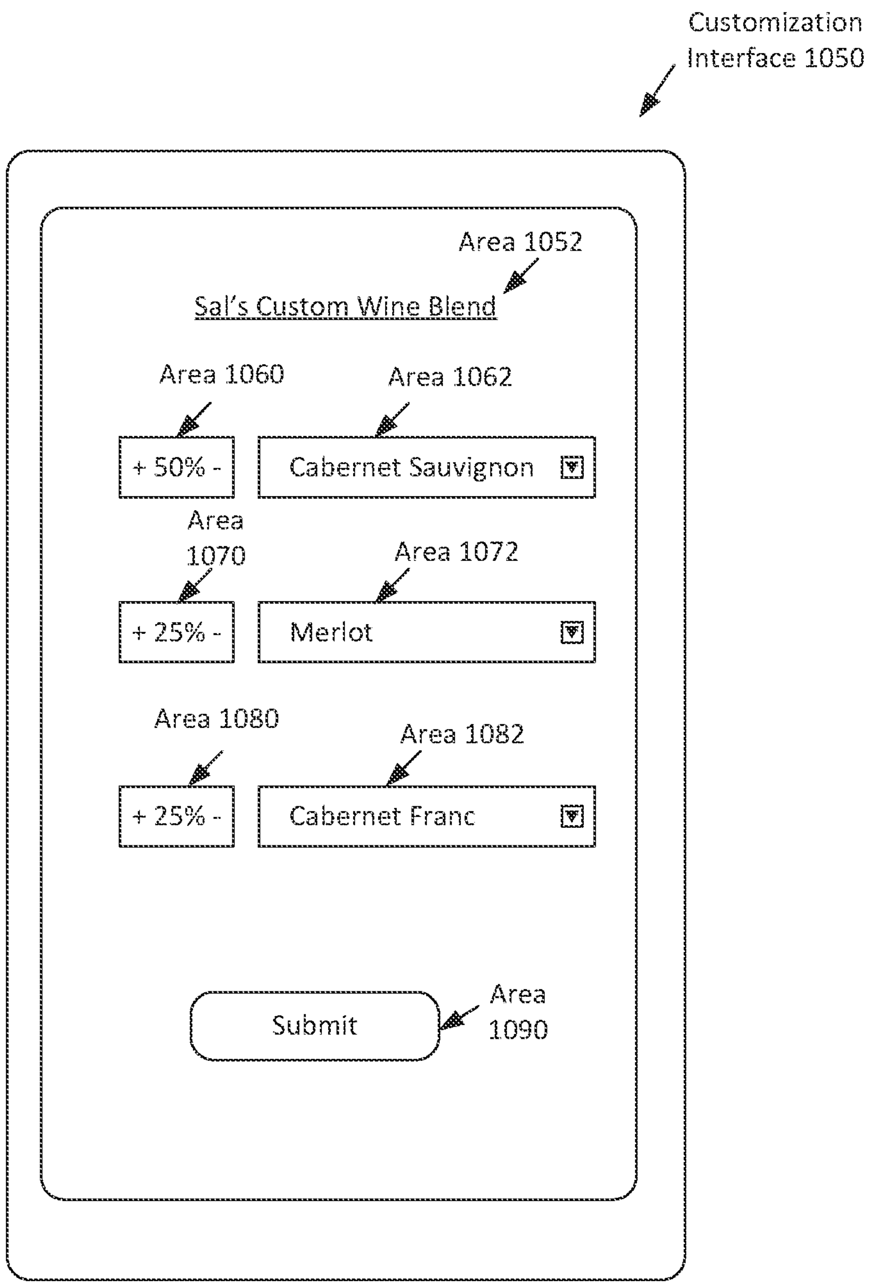
FIG. 10B is an example user interface for a dispensing system to customize a blending profile according to some embodiments.

FIG. 10B is an example user interface for a dispensing control system to customize a blending profile according to some embodiments. Entertainment venues may customize a particular combination of a beverage or food-like substance. The user may interact with a customization interface 1050 to customize a particular combination of ingredients. In some embodiments, the user may interact with an area 1052 to provide a name for the customized beverage. The user may interact with areas 1062, 1072, and 1082 to choose the type of beverage that may be used to customize a particular beverage. The types of ingredients available in a pull-down menu depend on the contents of the compressible liquid volumes in the dispensing system remotely controllable by the customization interface 1050. The user may interact with areas 1060, 1070, and 1080 to determine the ratio of each of the ingredients to be used in the customized beverage. Once the user has made their selection, the user may interact with an area 1090 to submit the particular combination of ingredients. In response to the user submitting the customized beverage by interacting with the area 1090, the user system may send control signals to the dispensing control system to store properties of the particular combination of ingredients to a dispensing profile datastore of the dispensing control system.

Figure 11:
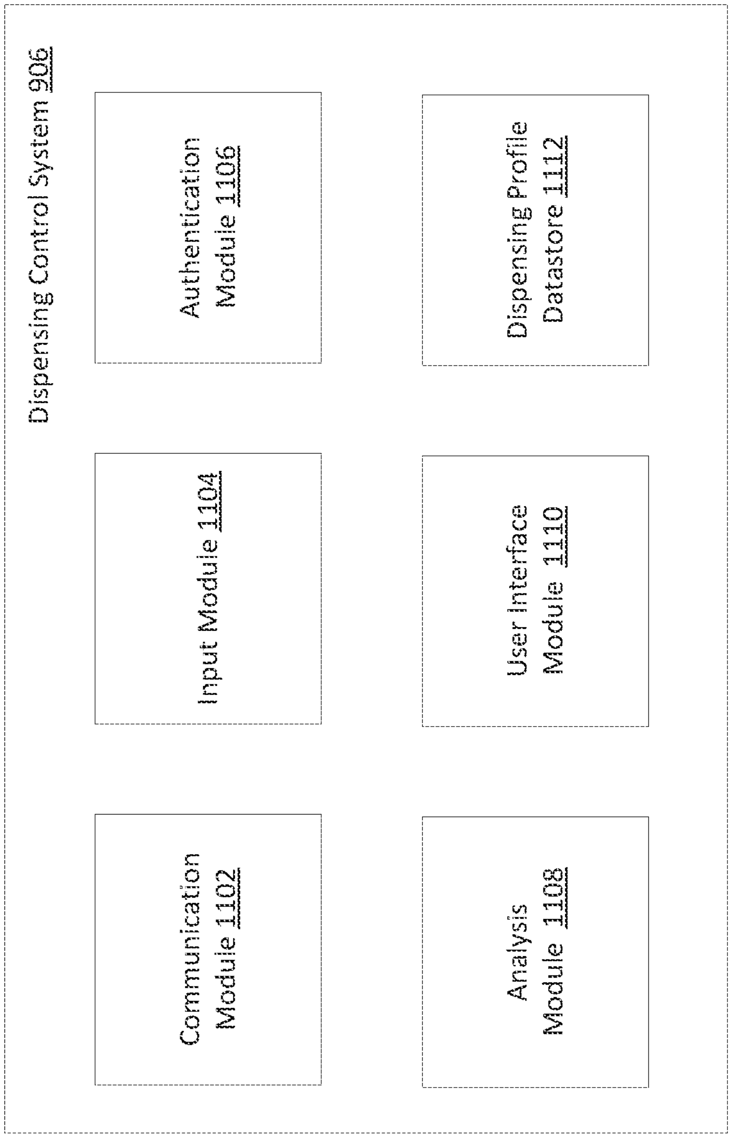
FIG. 11 is a block diagram of an example dispensing control system according to some embodiments.

FIG. 11 is a block diagram of a dispensing control system 906 according to some embodiments. The dispensing control system 906 includes a communication module 1102, an input module 1104, an authentication module 1106, an analysis module 1108, a user interface module 1110, and a dispensing profile datastore 1112.

The communication module 1102 may send and receive requests or data between any of the first entertainment venue 910, the second entertainment venue 912, and the inventory management system 930. The communication module 1102 of the first entertainment venue 910 may send dispensing information to the inventory management system 930. The communication module 1102 may receive a request to dispense a particular beverage from a user system 902. The communication module 1102 may send and receive requests or data between any of the modules of the dispensing control system 906.

In some embodiments, the input module 1104 may receive control signals from a local control system of the dispensing system or from one of the multiple user systems of the entertainment venue. The local control system includes a graphics display unit such as a touchscreen monitor. In some embodiments, the graphical user interface may include physical buttons. The touchscreen monitors and/or physical buttons may be situated or placed directly on the dispensing system. The user may interact with the graphical user interface to control one or more aspects of the dispensing system, including a controllable pressure system, controllable solenoid. In various embodiments, the input module 1104 may receive properties of one or more compressible liquid volumes such as the type of beverage/liquid (red wine, white wine, coffee, soft serve, etc.), a viscosity of the beverage/liquid, the minimum required diameter of conduit required for the beverage/liquid, any temperature constraints. The input module 1104 may receive this information when a compressible liquid volume is first introduced or first stored in the pressurized canister/cartridges.

The authentication module 1106 may authenticate the user identity. In some embodiments, the authentication module 1106 may need to authenticate the user's identity before the communication module 1102 sends control signals to the pressurized container 908 to dispense a requested beverage or food-like substance. In some embodiments, the authentication module 1106 may utilize biometric data from the user to authenticate their identity. For example, fingerprints, facial or voice recognition may be utilized to authenticate a user's identity. In some embodiments, a user may remotely control the dispensing system using a software application installed on a mobile computing device. The mobile computing device may include authentication of the user's identity using one or more of the mobile computing device's security features such as facial recognition, fingerprint sensors, retinal scan, and the like. The authentication module 1106 may take advantage of the mobile computing device's security features to authenticate the user's identity.

In various embodiments, the authentication module 1106 may determine if a user of the dispensing system has authority to control or manage a "self-service" stationary or mobile dispenser pour units, where individual customers can be pre-authenticated and pre-authorized to operate the self-service dispenser pour units (for example, biometrically or via being provided a "token" such as a magnetic, NFC, or RFID device) or an electronic token storable on their mobile device), enabling such pre-authorized customers to freely use self-service dispenser pour units, and, for example, charge their pours to their room in a hotel or to a previously provided credit card, or to a pre-authorized "allowance" (for example during an event). Such authentication can also serve to verify the customer's age. For example, before the initiation of pours of wines over $30 a glass, approval or authentication from a manager may be required. In some embodiments, the authentication module 1106 may track the identification of each user initiating a pour along with all related information (size of beverage poured, beverage poured, etc.).

For example, the analysis module 1108 may receive pre-defined recipes for beverages and food items using one or more of the compressible liquid volumes of the pressurized canister/cartridges. The pre-defined recipe may specify an amount of each of the ingredients of the beverage or food item and an order with which to add or mix the ingredients. The analysis module 1108 may utilize the pre-defined recipe to determine parameters (e.g., to create profiles) such as a period of time and an amount of pressure to apply to the pressurized canister/cartridge by a controllable pressure system to allow liquid to be selectively dispensed through a normally locked dispensing conduit connected to the pressurized canister/cartridge. Furthermore, the analysis module 1108 may utilize the pre-defined recipe to determine parameters such as a length of time to selectively open one or more controllable solenoids or valves to allow one or more liquids to flow from the compressible liquid volume in the pressurized canister/cartridge, through its respective transport conduit, and to a dispensing interface. In some embodiments, one or more liquids may flow to an internal or external mixing mechanism before arriving at the dispensing interface. In some embodiments, the analysis module 1108 may determine parameters such as a length of time to activate the internal or external mixing mechanism and a speed function of the internal or external mixing mechanism. The analysis module 1108 may determine these parameters based on at least a viscosity of the liquid contained within the compressible liquid volume and the diameter of the conduit coupled to the compressible liquid volume. Once the analysis module 1108 determines the parameters, the analysis module 1108 may send these parameters to the dispensing profile datastore 1112.

In some embodiments, the analysis module 1108 may estimate when a particular compressible liquid volume requires replacement. The analysis module 1108 may send this information to the consumable tracking system for tracking and analysis. In some embodiments, the analysis module 1108 may determine or estimate the number of beverages dispensed by any number of compressible liquid volumes.

In various embodiments, the analysis module 1108 may track individual beverage inventories and either provide re-order alerts or automatically place re-orders when particular beverage inventories drop below specified levels). In one embodiment, the analysis module 1108 may initiate an automatic cleaning and sanitization of the transport conduits of the dispensing system 904 by selectively opening solenoids or valves coupled to compressible liquid volumes filled with cleaning solution.

The user interface module 1110 may provide one or more user interfaces to a graphical display of the user system 902 of the service management system 900 of FIG. 9. An example of user interfaces may be found in FIGS. 10A and 10B.

The dispensing profile datastore 1112 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The dispensing profile datastore 1112 may create dispensing profiles entries for each recipe received by the service management system 900. In some embodiments, recipes may be customized or pre-defined by one or more users of the service management system 900. Each dispensing profile entry may include the names of all the ingredients required in the recipe. The dispensing profile may further include control parameters associated with the provision of the recipe. Control parameters may include a period of time and an amount of pressure to apply to the pressurized canister/cartridge, a length of time to selectively open one or more controllable solenoids or valves to allow one or more liquids to flow from the compressible liquid volume in the pressurized canister/cartridge. In some embodiments, control parameters may include a temperature to heat or cool the pressurized canister/cartridge or a mixing mechanism.

Figure 12:
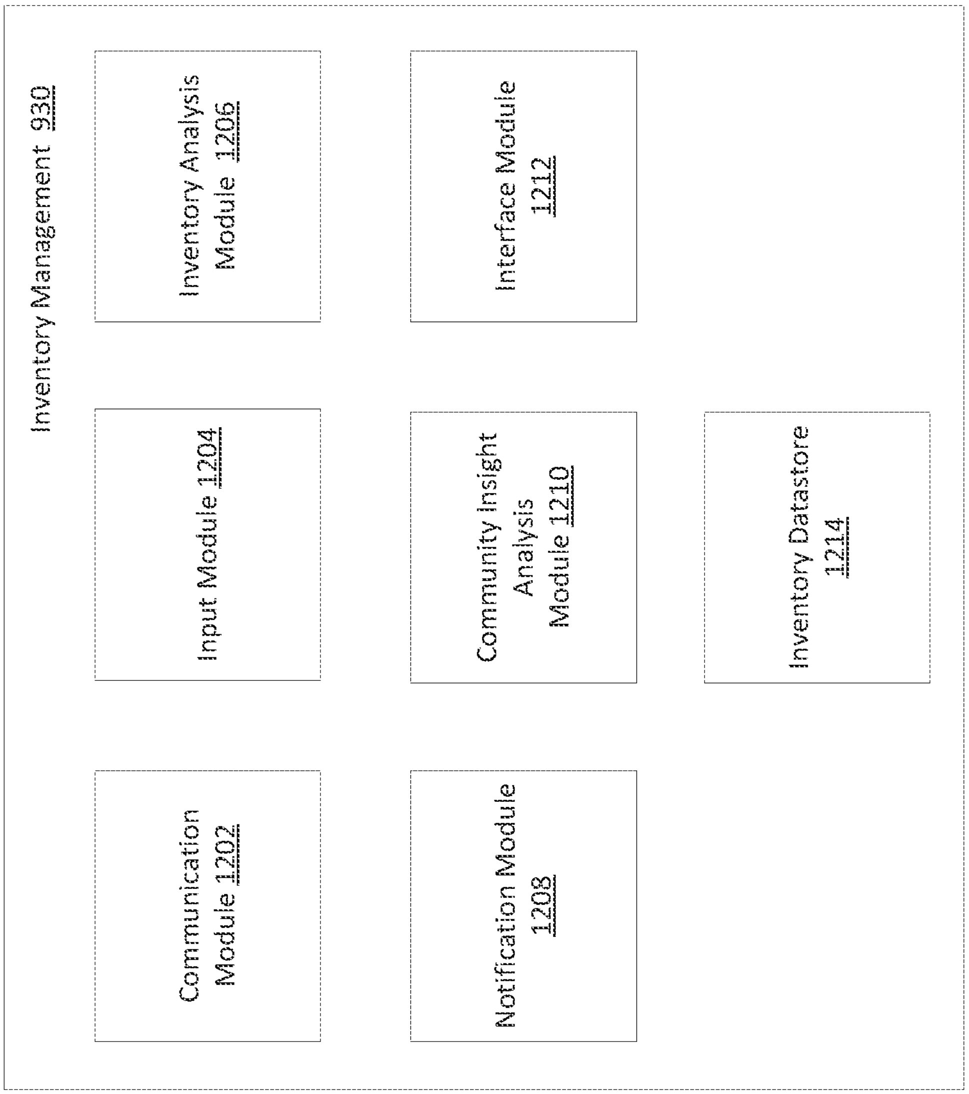
FIG. 12 is a block diagram of an example inventory management system according to some embodiments.

FIG. 12 is a block diagram of an inventory management system 930 according to some embodiments. The inventory management system 930 includes a communication module 1202, an input module 1204, an inventory analysis module 1206, a notification module 1208, a community insight analysis module 1210, an interface module 1212, and an inventory datastore 1214.

The communication module 1202 may send and receive data or requests between the optional consumable tracking system 909 and the 906 of the dispensing system 904. In some embodiments, the communication module 1202 may send and receive data or requests between any of the modules of the optional consumable tracking system 909.

In some embodiments, the input module 1204 may receive dispensing information from different entertainment venues using the dispensing system. Dispensing information may include types of compressible liquid volumes used by each of the entertainment venues, the amount of time elapsed to use up all the liquid in each compressible liquid volume, popular recipes used by one or more of the entertainment venues. In some embodiments, the input module 1204 may receive demographic information regarding customers patronizing the different entertainment venues.

In various embodiments, the input module 1204 may receive information from third-party systems outside the entertainment venues. For example, the input module 1204 may receive weather information from the National Weather Service, trending beverages or food featured in social networking platforms or streaming services, and upcoming schedules for local or national sports teams.

In various embodiments, the inventory analysis module 1206 may receive information from the input module 1204 to estimate when a particular compressible liquid volume used by a particular entertainment venue requires replacement. The inventory analysis module 1206 may send the estimate to the particular entertainment venue. In various embodiments, the inventory analysis module 1206 may utilize the dispensing information received from the different entertainment venues to determine beverages that are trending at a particular entertainment venue. The inventory analysis module 1206 may analyze the dispensing information received from a particular entertainment venue and/or demographic information of customers patronizing the particular entertainment venue to make recommendations of other beverages which may be popular based on beverages dispensed at the particular entertainment venue.

For example, the notification module 1208 may provide a message to one of the first entertainment venue 910, the second entertainment venue 912, or another entertainment venue (not shown) may provide various aspects of the entertainment venue's inventory, such as an order history for the first entertainment venue 910, an order status for a pending order of compressible liquid volumes, or an estimate of when one or more compressible liquid volumes may need to be replaced. The notification may be in the form of an email, a text message, an auditory signal, or a phone call. In one embodiment, the notification may be in the form of a banner or pop up on the user interface of the software application remotely capable of controlling the dispensing system.

In some embodiments, the inventory management system 930 may analyze the dispensing information from the first entertainment venue 910 and the communication network 920 to obtain an understanding of a community. For example, the community insight analysis module 1210 analyzes dispensing information from the first entertainment venue 910 and the communication network 920 to obtain an understanding of a community. For example, the community insight analysis module 1210 may determine that a particular beverage or a particular ingredient of a beverage or food item is popular with both the first entertainment venue 910 and the second entertainment venue 912. The community insight analysis module 1210 may send a notification to the first entertainment venue 910 and the second entertainment venue 912 that both venues may pool their resources and make a single order of the particular beverage or the particular ingredient of a beverage or food item in order to obtain a better price from a wholesaler or distributor.

In some embodiments, the dispensing information of the dispensing system received by the community insight analysis module 1210 from the various entertainment venues may be an aggregate or a summary of the dispensing data, such as the number of beverages or food-like substances dispensed by the dispensing system per day or per hour, the number of compressible liquid volumes being utilized by each entertainment venue per day or per hour, and the type of entertainment venue, such as restaurant, bar, coffee shop, or café.

In another example, the community insight analysis module 1210 may use dispensing information from a variety of entertainment venues to determine community or region trends. For example, the community insight analysis module 1210 may determine that in the last two weeks, there has been an increase in patrons of the first entertainment venue 910 and the second entertainment venue 912 ordering a particular drink. The community insight analysis module 1210 may utilize this information and send a notification of a recommendation of the particular drink to a third entertainment venue (not shown) in the same geographic region as the first entertainment venue 910 and the communication network 920.

In one embodiment, the community insight analysis module 1210 may use other third-party information to make recommendations of beverages and other food-like substances which would require ingredients from compressible liquid volumes to entertainment venues with dispensing systems. For example, the community insight analysis module 1210 may receive information that a new restaurant is opening up in the same region as the first entertainment venue 910. In response to this new information, the community insight analysis module 1210 may send recommendations of new beverages which may complement food at the new restaurant. For example, if the new restaurant is a Vietnamese restaurant, the community insight analysis module 1210 may provide recipes or recommendations for Vietnamese coffee or other drinks that may compliment a Vietnamese meal. Alternatively, the community insight analysis module 1210 may send recommendations to the first entertainment venue 910 to provide promotions, such as buy-one-get-one-free promotions around the time of the new restaurant's grand opening to increase foot traffic.

In various embodiments, the interface module 1212 may provide a graphical interface to a graphical display of a user system 902 or one or more of the first entertainment venue 910, second entertainment venue 912, or some other entertainment venue.

The inventory datastore 1214 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The inventory datastore 1214 venue entries for each venue using the dispensing system. Each venue entry may include properties of each venue such as a name, an address, average number of compressible liquid volumes dispensed a day or week, the types of beverages or food-like substances served at the venue, recipes dispensed at the venue, most popular ingredients, beverages, and recipes at the venue, and the like.

Figure 13:
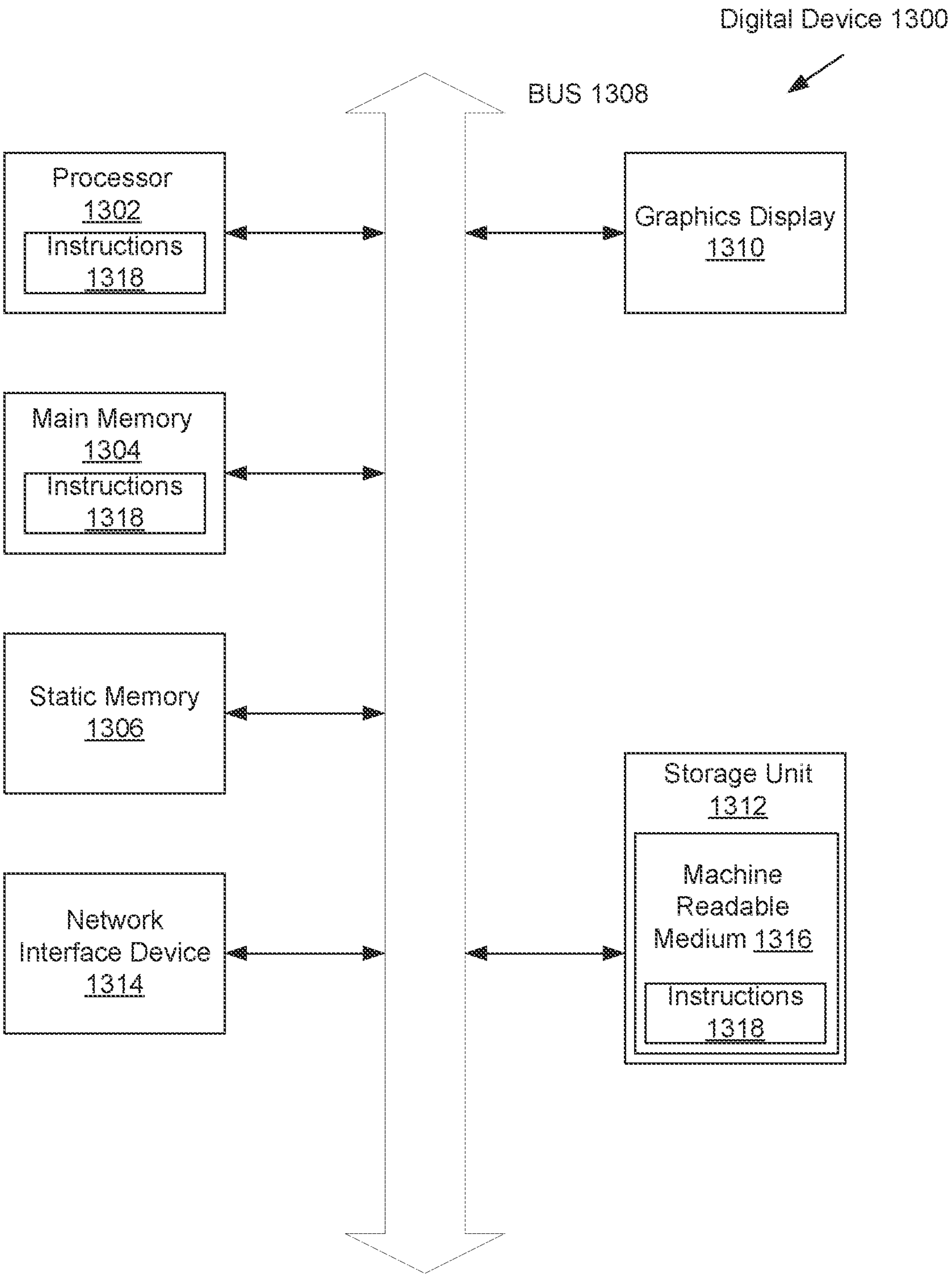
FIG. 13 is an example of a digital device in some embodiments.

FIG. 13 is a block diagram illustrating entities of an example digital device able to read instructions from a machine-readable medium and execute those instructions in a processor to provide control functions, provide interfaces, receive commands, and the like as discussed herein. Specifically, FIG. 13 shows a diagrammatic representation of a digital device in the example form of a digital device 1300 within which instructions 1324 (e.g., software) for causing the machine to perform any one or more of the methodologies discussed herein may be executed. In alternative embodiments, the machine operates as a standalone device or may be connected (e.g., networked) to other machines, for instance, via the Internet.

The digital device may include a processor and memory any may include a PIC, processor, raspberry PI, or the like.

The example digital device 1300 includes a processor 1302 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1304, and a static memory 1306, which are configured to communicate with each other via a bus 1308. The digital device 1300 may further include a graphics display unit 1310 (e.g., a plasma display panel (PDP), a liquid crystal display (LCD), a projector, or a cathode ray tube (CRT)). The digital device 1300 may also include a data store 1312 and a network interface device 1314, which also are configured to communicate via the bus 1308.

The data store 1312 includes a machine-readable medium 1316 on which is stored instructions 1318 (e.g., software) embodying any one or more of the methodologies or functions described herein. The instructions 1318 (e.g., software) may also reside, completely or at least partially, within the main memory 1304 or within the processor 1302 (e.g., within a processor's cache memory) during execution thereof by the digital device 1300, the main memory 1304 and the processor 1302 also constituting machine-readable media. The instructions 1318 (e.g., software) may be transmitted or received over a network (not shown) via optional network interface 1314.

While machine-readable medium 1316 is shown in an example embodiment to be a single medium, the term "machine-readable medium" should be taken to include a single medium or multiple media (e.g., a centralized or distributed database, or associated caches and servers) able to store instructions (e.g., instructions 1318). The term "machine-readable medium" shall also be taken to include any medium that is capable of storing instructions (e.g., instructions 1318) for execution by the digital device and that cause the machine to perform any one or more of the methodologies disclosed herein. The term "machine-readable medium" includes, but should not be limited to, data repositories in the form of solid-state memories, optical media, and magnetic media.

Figure 14:
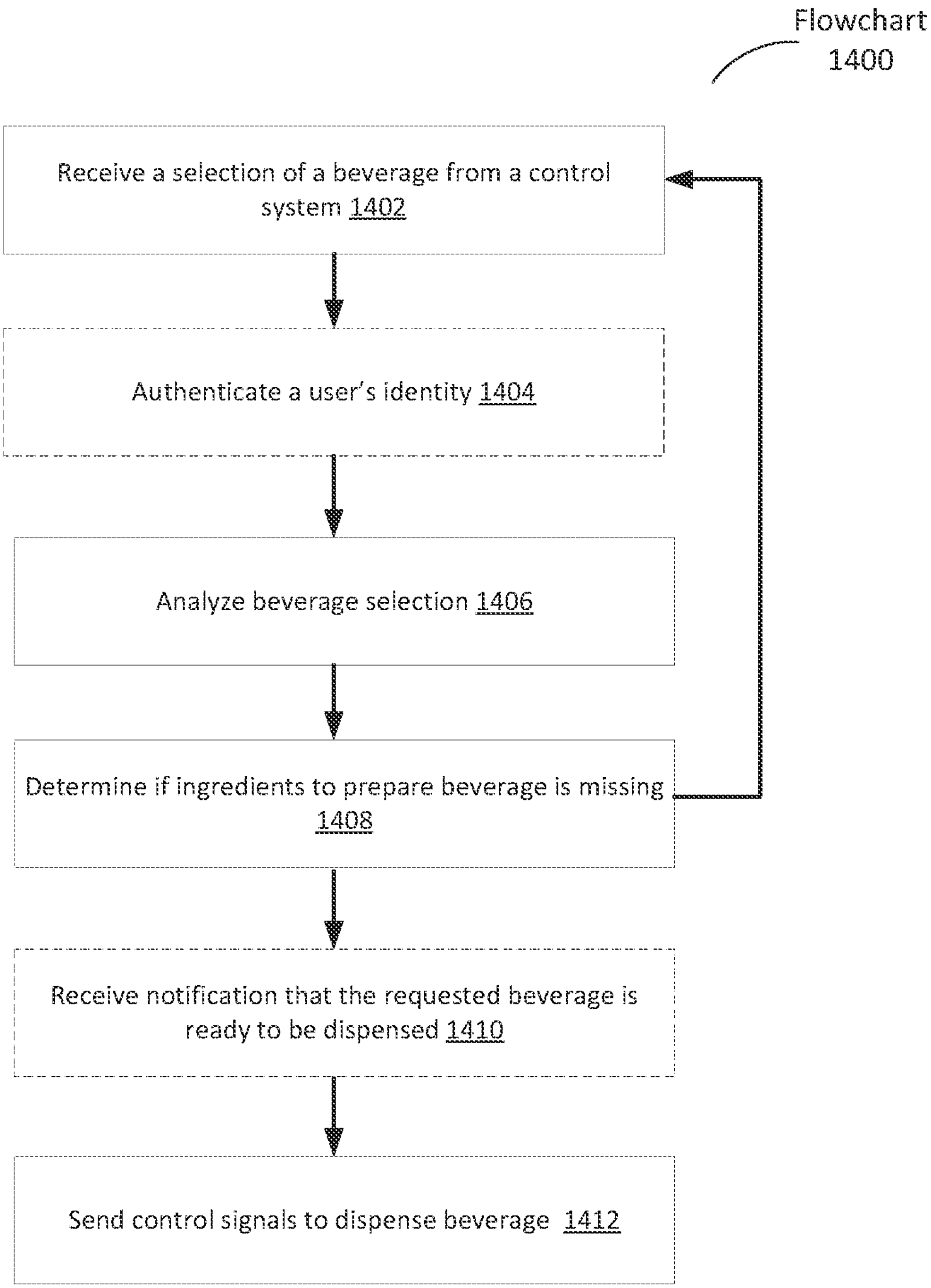
FIG. 14 is a flow chart of a method of the dispensing system receiving an order for a beverage according to some embodiments.

FIG. 14 is a flow chart 1400 of a method of the dispensing system receiving an order for a beverage according to some embodiments.

In step 1402, the dispensing control system 906 may receive a request for a particular beverage from a user of the user system 902. The user may be an employee of an entertainment venue such as a bartender or waiter/waitress. In some embodiments, the user may be a customer or patron of the entertainment venue. In one embodiment, the user system 902 may be a local dispensing control system 48*a* or a mobile computing device. The user may interact with the local dispensing control system, such as the local dispensing control system 48*a* of FIG. 1, or a software application. The local dispensing control system may include a graphical user interface and may be situated at a dispensing interface of the dispensing system. The local dispensing control system may provide control signals to request the particular beverage from the dispensing system 904. The software application may be installed on a mobile computing device and may be remotely controllable to request a beverage from the dispensing system 904. An example of a graphical user interface of the software application may be found in FIG. 10A.

Before the beverage requested by the user may be dispensed, the authentication module 1106 may authenticate the user's identity, as depicted in optional step 1404. There are several ways the user may provide information regarding the user's identity to the dispensing control system 906. For example, a bartender may input a personalized security code to the local dispensing control system before or after sending a request to the dispensing control system 906 for the particular beverage. In another example, a fingerprint scanner, or an image capture device may be integrated into local dispensing control system to allow the dispensing system to use biometric data such as fingerprints, retinal scan, or facial recognition.

In some embodiments, the user may utilize the mobile computing device with a software application installed thereon to remotely control the dispensing control system 906. The mobile computing device may include authentication of the user's identity using one or more of the mobile computing device's security features such as facial recognition, fingerprint sensors, retinal scan, and the like. The authentication module 1106 may take advantage of the mobile computing device's security features to authenticate the user's identity. In some embodiments, step 1404 may be optional.

In step 1406, the beverage requested by the user in step 1402 may be sent to the analysis module 1108. The analysis module 1108 may determine if the requested beverage is one of the multiple pre-defined recipe stored in the dispensing profile datastore 1112. In some embodiments, the analysis module 1108 may compare the requested beverage with the pre-defined recipes of beverages stored in the dispensing profile datastore 1112.

In step 1408, the analysis module 1108 may determine if the ingredients required to make the requested beverage can be found in the pressurized container 908 of the dispensing system 904 in amounts sufficient to satisfy the requested beverage. If the analysis module 1108 determines that if one or more of the ingredients required to make the requested beverage, or if there are insufficient amounts of one or more of the ingredients to make the requested beverage then the 1108 may send a notification to the user interface module 1110 to provide a notification to the local dispensing control system or to a graphical display of the user system 902 that the beverage may not be dispensed by the dispensing system 904. In such a case, the dispensing control system 906 may receive a request for a beverage from a user of the user system 902.

In step 1410, the input module 1104 may receive notification from a dispensing interface that the requested beverage is ready to be dispensed. In some embodiments, this notification may be received when a proper glass has been placed in the dispensing interface. In some embodiments, the dispensing interface may be a dispenser pour unit such as the dispensing pour unit 700 of FIG. 7A. Entertainment venues may place tracking sensors on some or all of the drinkware for purposes of identification or inventory tracking. Tracking sensors may include RFID, bar codes, QR codes, and the like. The dispensing control system 906 may utilize these tracking sensors to identify the drinkware placed in the dispensing interface. For example, if the requested beverage is a martini, the dispensing interface may send a notification to the input module 1104 of the dispensing control system 906 when the dispensing interface determines that a martini glass has been placed in the dispensing interface. In one embodiment, the dispensing interface may send the notification to the input module 1104 of the dispensing control system 906 when a user interacts with the local dispensing control system or the mobile computing device. In some embodiments, the step 1410 may be optional.

In step 1412, the dispensing control system 906 may send control parameters required to dispense the requested beverage to the pressurized container 908 and the dispensing interface. Control parameters may include a period of time and an amount of pressure to apply to the pressurized canister/cartridge, a length of time to selectively open one or more controllable solenoids or valves to allow one or more liquids to flow from the compressible liquid volume in the pressurized canister/cartridge. In some embodiments, control parameters may include a temperature to heat or cool the pressurized canister/cartridge or a mixing mechanism.

Thus, while there have been shown and described and pointed out fundamental novel features of the inventive system and method as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

The invention claimed is:

1. A system for selectively managing dispensing of a portion of a liquid volume stored in a pressurized environment, the system comprising:

an incompressible, pressurized container including a hollow housing portion and an outer portion, the pressurized container being airtight and operable to maintain a pressure level in an internal pressurized environment in the hollow housing portion;

a transport system including a first liquid transport conduit and a second liquid transport conduit, and a mixing component, each of the first liquid transport conduit and the second liquid transport conduit including a first end and a second end, the first end of the first liquid conduit being releasably coupled to a pressurized container interface coupled to the hollow housing portion of the pressurized container, the second end of the first liquid transport conduit being coupled to the mixing component, the first end of the second liquid transport conduit being configured to receive one or more ingredients from outside the internal pressurized environment, the second end of the second liquid transport conduit being coupled to the mixing component, each of the first liquid transport conduit and the second liquid transport conduit including a controllable valve to enable or disable a flow of a liquid volume, the pressurized container interface capable of maintaining the pressure level in the internal pressurized environment in the hollow housing portion, the mixing component being coupled to the at least the first liquid transport conduit and the second liquid transport conduit and the dispensing interface to enable mixing prior to dispensing;

a pressure regulation system connected to the pressurized container, the pressure regulation system including at least one pressure conduit extending from the outer portion through a pressure interface and into the hollow housing portion of the pressurized container, the pressure regulation system operable to exert and maintain the pressure level within the pressurized container to enable compression of a first compressible liquid volume in the internalized pressurized environment; and a control system operable to control the controllable valves and the pressure regulation system.

2. The system of claim 1, wherein the mixing component includes a mixing chamber, the mixing chamber being an enclosed cavity which allows the liquid volume within the first liquid transport conduit and the second liquid transport conduit to blend.

3. The system of claim 1, wherein the mixing component includes a venturi.

4. The system of claim 1, wherein the control system receives control signals to dispense liquid from the first liquid transport conduit and the second liquid transport conduit according to a blending profile.

5. The system of claim 1, wherein the control system receives control signals to selectively control one or more of the controllable valves of the first liquid transport conduit and the second liquid transport conduit.

6. The system of claim 1, wherein the control system receives control signals from a mobile computing device to blend liquid from the first liquid transport conduit and the second liquid transport conduit.

7. The system of claim 1, wherein the dispensing interface comprises a multi-pour nozzle, the multi-pour nozzle comprising a plurality of nozzle elements, each of the plurality of nozzle elements capable of being connected to a different liquid transport conduit, each of the different liquid transport conduits being capable of being coupled to a different compressible liquid volume by a different releasable connection.

8. The system of claim 7, wherein the multi-pour nozzle is configured to be equipped with a blend pour functionality, enabling pressurized liquid from two or more dispensing conduits to be dispensed in a blended pour.

9. The system of claim 8, wherein the multi-pour nozzle comprises 2 to 9 nozzle elements.

10. The system of claim 9, wherein the control system is remotely operable to selectively activate substantially simultaneously two or more nozzle elements to enable the blend pour functionality.

11. The system of claim 1, wherein the control system is remotely operable to control the pressure regulation system to exert the pressure level in the internal pressurized environment to enable compression of the compressible pressurized container in the internal pressurized environment.

12. The system of claim 1, wherein the pressurized liquid comprises an alcoholic beverage.

13. The system of claim 12, wherein the alcoholic beverage comprises a mixed drink.

14. The system of claim 1, wherein the valve is a solenoid valve.

15. A method comprising:

receiving a first signal from a control signal to open a first valve and a second valve, the first valve being coupled to an incompressible, pressurized container, the pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible liquid volume to be stored within the hollow housing portion; and in response to the first signal to open the first valve and a second valve, opening a first valve of a first liquid transport conduit and opening a second valve of a second liquid transport conduit, and blending liquid from the first liquid transport conduit and the second liquid transport conduit in a mixing component, the first liquid transport conduit being capable of enable or disabling a flow of liquid from the first compressible liquid volume, the second liquid transport conduit being capable of enable or disabling a flow of liquid from outside the pressurized container, the first liquid transport conduit extending from a pressurized container interface of the hollow housing portion of the pressurized container to a dispensing interface, the second liquid transport conduit being coupled to the dispensing interface, the pressurized container interface capable of maintaining the pressure level in the internal pressurized environment in the hollow housing portion, a pressure regulation system operable to exert and maintain the pressure level within the pressurized container to enable compression of the first compressible liquid volume in the internalized pressurized environment.

16. The method of claim 15, wherein mixing component includes a mixing chamber, the mixing chamber being an enclosed cavity which allows the liquid volume within the first liquid transport conduit and the second liquid transport conduit to blend.

17. The method of claim 15, wherein the mixing component includes a venturi.

18. The method of claim 15, wherein the dispensing interface comprises a multi-pour nozzle, the multi-pour nozzle comprising a plurality of nozzle elements, each of the plurality of nozzle elements capable of being connected to a different liquid transport conduit, each of the different liquid transport conduits being capable of being coupled to a different compressible liquid volume by a different releasable connection.

19. The method of claim 15, wherein the first signal is received from a mobile computing device to dispense liquid from the first compressible liquid volume and the second liquid transport conduit according to a blending profile.

* * * * *